(12) United States Patent
Winters

(10) Patent No.: US 10,132,477 B1
(45) Date of Patent: Nov. 20, 2018

(54) MOUNTING ASSEMBLY OF A LIGHT FIXTURE

(71) Applicant: Philip Dean Winters, Senoia, GA (US)

(72) Inventor: Philip Dean Winters, Senoia, GA (US)

(73) Assignee: Cooper Technologies Company, Houston, TX (US)

(*) Notice: Subject to any disclaimer, the term of this patent is extended or adjusted under 35 U.S.C. 154(b) by 0 days.

(21) Appl. No.: 15/192,143

(22) Filed: Jun. 24, 2016

(51) Int. Cl.
| | |
|---|---|
| F21V 7/04 | (2006.01) |
| F21V 17/16 | (2006.01) |
| F21S 8/02 | (2006.01) |
| F21V 23/02 | (2006.01) |
| F21V 17/10 | (2006.01) |
| F21V 21/30 | (2006.01) |
| F21V 8/00 | (2006.01) |
| F21Y 115/10 | (2016.01) |

(52) U.S. Cl.
CPC .............. F21V 17/166 (2013.01); F21S 8/02 (2013.01); F21V 17/104 (2013.01); F21V 21/30 (2013.01); F21V 23/026 (2013.01); G02B 6/0068 (2013.01); G02B 6/0083 (2013.01); G02B 6/0088 (2013.01); *F21Y 2115/10* (2016.08)

(58) Field of Classification Search
CPC ...... F21V 17/166; F21V 17/104; F21V 21/30; F21V 23/026; F21V 21/044; F21V 21/02; F21V 17/162; F21S 8/02; G02B 6/0068; G02B 6/0083; G02B 6/0088; F21Y 2115/10
USPC .......................................................... 362/612
See application file for complete search history.

(56) References Cited

U.S. PATENT DOCUMENTS

| | | | |
|---|---|---|---|
| 6,343,873 B1* | 2/2002 | Eberhard ................... | F21S 8/02 362/147 |
| 8,696,158 B2 | 4/2014 | Santiago | |
| 2005/0183344 A1 | 8/2005 | Ziobro | |
| 2010/0061108 A1 | 3/2010 | Zhang | |
| 2011/0267826 A1 | 11/2011 | Santiago | |
| 2012/0275162 A1 | 11/2012 | Spiro | |
| 2013/0100658 A1* | 4/2013 | Pickard ..................... | F21S 8/02 362/230 |
| 2013/0215623 A1* | 8/2013 | Goodman ............... | F21V 21/00 362/341 |
| 2014/0268825 A1 | 9/2014 | Lay | |

* cited by examiner

*Primary Examiner* — Anh Mai
*Assistant Examiner* — Meghan Ulanday
(74) *Attorney, Agent, or Firm* — King & Spalding LLP

(57) ABSTRACT

A mounting assembly includes a mounting plate that has a central aperture and a plurality of elongated slots disposed on opposite sides of the central aperture. The plurality of elongated slots are configured to flexibly mount a light fixture to junction boxes or recessed cans of different sizes. Further, the mounting assembly includes one or more torsion spring brackets to mount the light fixture in recessed cans. The one or more torsion spring brackets are configured to toollessly couple with the mounting plate via one or more of the plurality of elongated slots. Once the light fixture is mounted to a junction box or a recessed can, the mounting plate allows the light fixture to rotate clockwise or counter-clockwise along one or more of the plurality of elongated slots. Furthermore, the mounting assembly includes spring clip brackets and mousetrap like spring clips to surface mount the light fixture.

20 Claims, 21 Drawing Sheets

MOUNTING ASSEMBLY OF A LIGHT FIXTURE

TECHNICAL FIELD

The present disclosure relates generally to lighting fixtures, and in particular to a mounting assembly of a light fixture.

BACKGROUND

Conventional mounting assemblies may not be designed to allow one mounting means to accommodate different types of light fixture mounting, e.g., surface mounting, recessed can mounting, junction box mounting, etc. Further, conventional mounting assemblies may require a customer to use one or more mounting/installation tools and/or to have the know-how to use those installation tools for mounting a light fixture to a mounting surface. This may prove to be inconvenient to the customer.

Furthermore, conventional mounting assemblies may not be designed to flexibly fit a light fixture within housings (e.g., recessed cans or junction boxes) having differently sized nominal diameter openings. For example, one mounting assembly may be designed to fit the light fixture within a recessed can having a six inch nominal diameter opening. However, the same mounting assembly may not be suitable for mounting the light fixture within a recessed can having a five inch nominal diameter opening. Accordingly, two different mounting assemblies may have to be designed, i.e., one to fit the light fixture within the recessed can having the five inch diameter opening and another to fit the light fixture within the recessed can having the six inch diameter opening. The inability of the conventional mounting assemblies to flexibly fit a light fixture within housings having differently sized openings and/or to allow different types of light fixture mountings may increase the number of stock keeping units (SKUs) which may be inconvenient for a manufacturer and/or a distributor. Also, the increased number of SKUs may increase the product cost for the end user (customer).

Additionally, conventional mounting assemblies may not allow post-mounting adjustment of the light fixture in order to align the light fixture as desired by the customer. Such post-mounting adjustment of the light fixture may be beneficial while mounting a light fixture that has a non-circular form factor. For example, a light fixture having a square form factor may have to be adjusted after installation to align the edges of the light fixture with the edges of a room in which the light fixture is installed. The inability of the conventional mounting assemblies to allow post-mounting adjustment may limit the shape and type of light fixtures that may be mounted using the conventional mounting assemblies.

In light of the above mentioned deficiencies, there remains a need for a mounting assembly that can accommodate different types of mountings and can provide flexibility of mounting light fixtures having different form factors within housings (e.g., recessed can, junction box, etc.) of different sizes and/or shapes. Further, there remains a need for a mounting assembly that that minimizes the requirement for tools or provides toolless mounting of light fixtures.

SUMMARY

In one aspect, the present disclosure can relate to a light fixture. The light fixture includes a light module assembly. Further, the light fixture includes a mounting plate that is coupled to the light module assembly. The mounting plate includes a central aperture, a first set of elongated slots disposed on one side of the central aperture, and a second set of elongated slots disposed on an opposite side of the central aperture. Each set of elongated slots include an inner pair of elongated slots and an outer pair of elongated slots. Further, the inner pair of elongated slots are arranged closer to the central aperture than the outer pair of elongated slots. Furthermore, the light fixture includes a torsion spring assembly. The torsion spring assembly includes one or more torsion spring brackets, where each torsion spring bracket is configured to toollessly couple with the mounting plate via at least one of the two sets of elongated slots. The torsion spring assembly is configured to mount the light module assembly in a recessed can having a first diameter when the one or more torsion spring brackets are coupled to the mounting plate via the inner pair of elongated slots of the at least one of the two sets of elongated slots. Further, the torsion spring assembly is configured to mount the light module assembly in a recessed can having a second diameter when the one or more torsion spring brackets are coupled to the mounting plate via the outer pair of elongated slots of the at least one of the two sets of elongated slots.

In another aspect, the present disclosure can relate to a light fixture. The light fixture includes a light module assembly and a mounting plate that is coupled to the light module assembly. The mounting plate includes a central aperture, a first set of elongated slots disposed on one side of the central aperture, and a second set of elongated slots disposed on an opposite side of the central aperture. Each set of elongated slots include an inner pair of elongated slots and an outer pair of elongated slots. Further, the inner pair of elongated slots are arranged closer to the central aperture than the outer pair of elongated slots. The inner pair of elongated slots is configured to mount the light module assembly to a junction box having a first diameter via one or more fasteners that pass through at least one elongated slot of the inner pair of elongated slots, and the outer pair of elongated slots is configured to mount the light module assembly to a junction box having a second diameter via one or more fasteners that pass through at least one elongated slot of the outer pair of elongated slots. The second diameter is larger than the first diameter.

In yet another aspect, the present disclosure can relate to a light fixture. The light fixture includes a surface mounting trim that includes a base portion and a side wall extending substantially perpendicular to the base portion. The surface mounting trim defines a cavity and a light module assembly is disposed in the cavity. Further, the light fixture includes one or more spring clip brackets that are disposed on the light module assembly and coupled to the side wall of the surface mounting trim. Each spring clip bracket is coupled to a mousetrap like spring clip that is configured to engage with a mounting surface to securely retain the light fixture when the light fixture is surface mounted to the mounting surface.

These and other aspects, objects, features, and embodiments will be apparent from the following description and the appended claims.

BRIEF DESCRIPTION OF THE DRAWINGS

The foregoing and other features and aspects of the disclosure are best understood with reference to the following description of certain example embodiments, when read in conjunction with the accompanying drawings, wherein.

Figure 1:
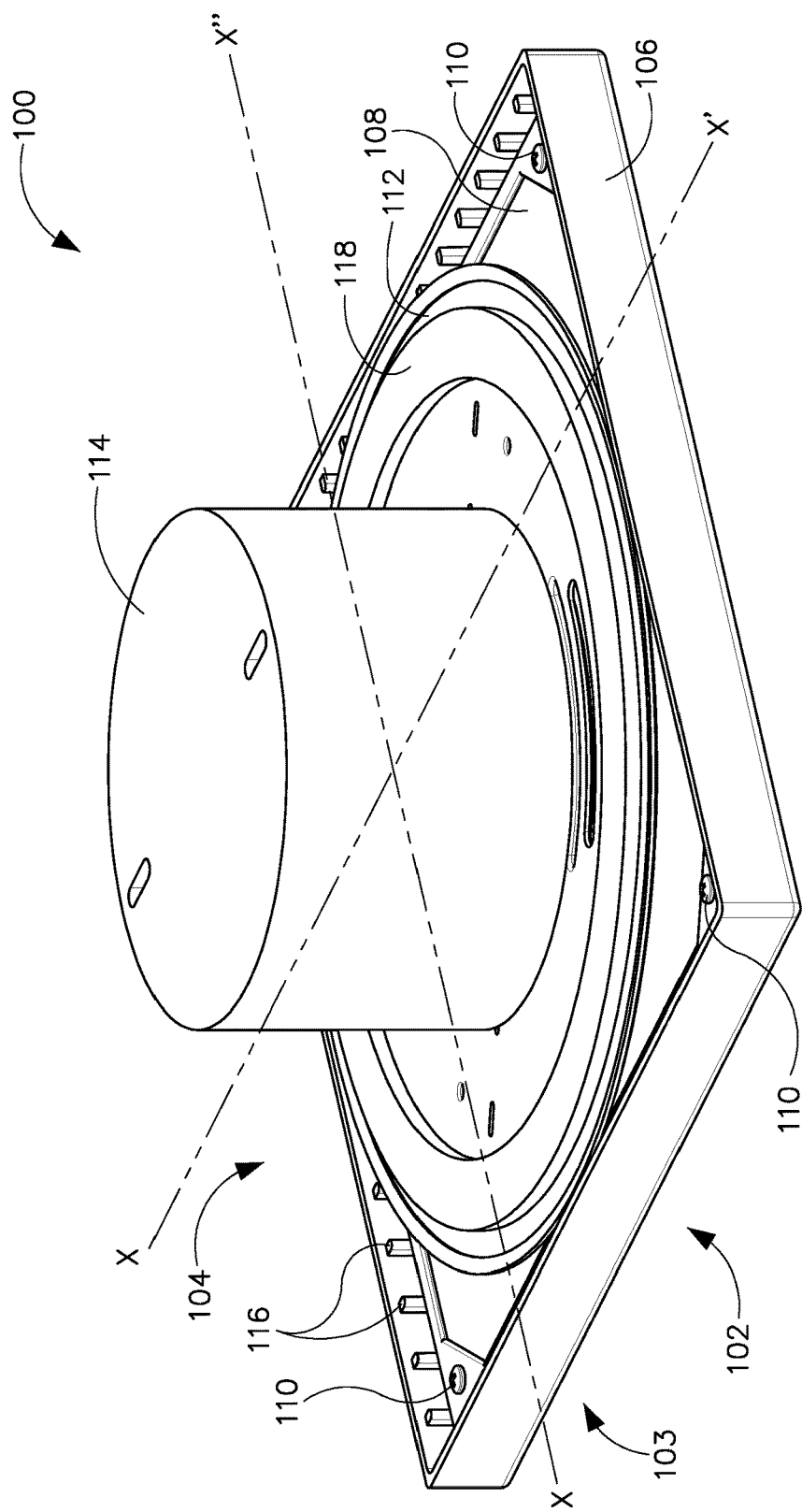
FIG. 1 illustrates a top perspective view of a light fixture mounted to a junction box, in accordance with an example embodiment of the present disclosure.

The drawings illustrate only example embodiments of the disclosure and are therefore not to be considered limiting of its scope, as the disclosure may admit to other equally effective embodiments. The elements and features shown in the drawings are not necessarily to scale, emphasis instead being placed upon clearly illustrating the principles of the example embodiments. Additionally, certain dimensions or positioning may be exaggerated to help visually convey such principles.

DETAILED DESCRIPTION OF EXAMPLE EMBODIMENTS

In the following paragraphs, the present disclosure will be described in further detail by way of examples with reference to the attached drawings. In the description, well known components, methods, and/or processing techniques are omitted or briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

An example mounting assembly of the present disclosure includes a mounting plate. In particular, the mounting plate includes a central opening that is configured to receive a driver component and/or a spring tab member that is configured to snap lock the mounting plate to the light fixture. Further, the mounting plate includes a plurality of elongated slots that have a substantially curved profile. The plurality of elongated slots are divided into two sets of elongated slots, a first set disposed on one side of the central opening and a second set disposed on an opposite side of the central opening. Each set of elongated slots includes multiple pairs of elongated slots arranged such that they are concentric with the central aperture and such that the length of the elongated slots may increase from the central aperture towards an outer perimeter of the mounting plate. Corresponding elongated slot pairs of the two sets of elongated slots may be used in combination to mount the light fixture to: (1) a recessed can having a first diameter, (2) a recessed can having a second diameter, or (3) junction boxes of different sizes.

In an example where the light fixture is mounted in a recessed can, the mounting assembly further includes one or more torsion spring brackets that are configured to toollessly (i.e., without any tools) couple with the mounting plate via the pairs of elongated slots. In another example where the light fixture is mounted to the junction box, the mounting assembly may not include the torsion spring brackets. Instead, the mounting plate of the light fixture may be directly coupled to the junction box using fasteners, e.g., screws, that pass through one or more of the plurality of elongated slots.

Once the light fixture is mounted to either a recessed can or a junction box via the elongated slots of the mounting plate, the light fixture may be rotated clockwise or counter-clockwise about an axis that is normal to the surface to which the light fixture is mounted, such as a ceiling. The rotation allows the light fixture to be adjusted such that the edges of the light fixture align with the edges of a room, for example, in the case of a light fixture having a non-circular profile.

In yet another example where the light fixture is surface mounted, the mounting assembly may not include the mounting plate. Instead, the mounting assembly includes a surface mounting trim that houses the light fixture, and spring clip brackets that are coupled to the surface mounting trim. Further, the mounting assembly includes mousetrap like spring clips that are attached to the spring clip brackets. The mousetrap like spring clips may be spring wound such that pressure has to be applied to move the spring clips away from their default position. However, once the pressure is removed, the spring clips revert back to their default position. The mousetrap like spring clips allow the light fixture to be securely retained in the surface mounted position.

Technology of the present disclosure can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples" or "example embodiments" given herein are intended to be non-limiting and among others supported by representations of the present technology.

Moving now to discuss the figures, FIGS. 1-10 will describe a junction box mounting of the light fixture, as an example embodiment of the mounting assembly of the present disclosure; FIGS. 11-14 will describe a recessed can mounting of the light fixture, as another example embodiment of the mounting assembly of the present disclosure; and FIGS. 15-19 will describe a surface mounting of the light fixture, as yet another example embodiment of the mounting assembly of the present disclosure. It is noted that FIGS. 11-19 will be described by making exemplary reference back to FIGS. 3, 5, 7, and 8 as may be appropriate or helpful.

I. Junction Box Mounting

Figure 2:
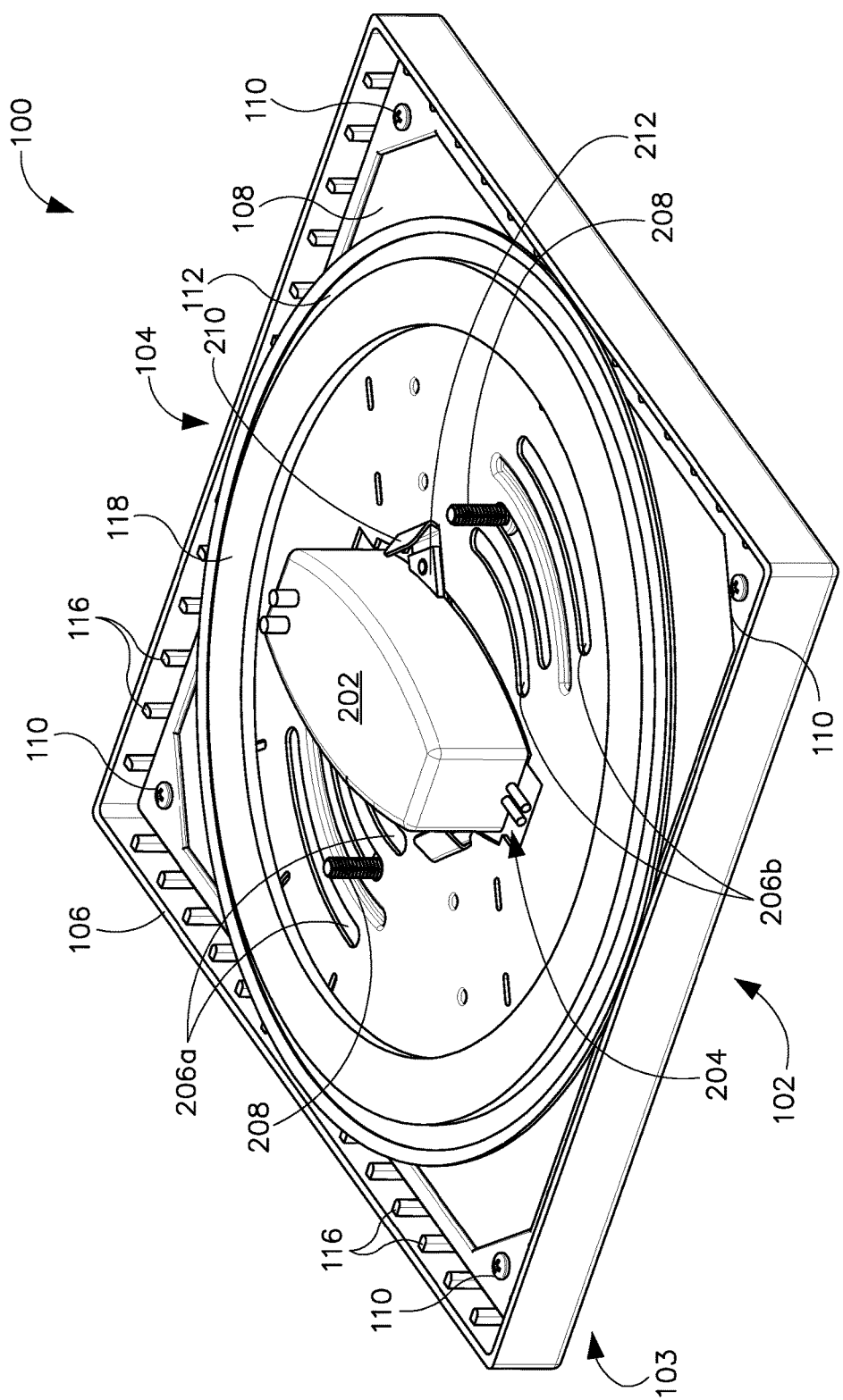
FIG. 2 illustrates a top perspective view of the light fixture of FIG. 1 without the junction box, in accordance with an example embodiment of the present disclosure.
Figure 3:
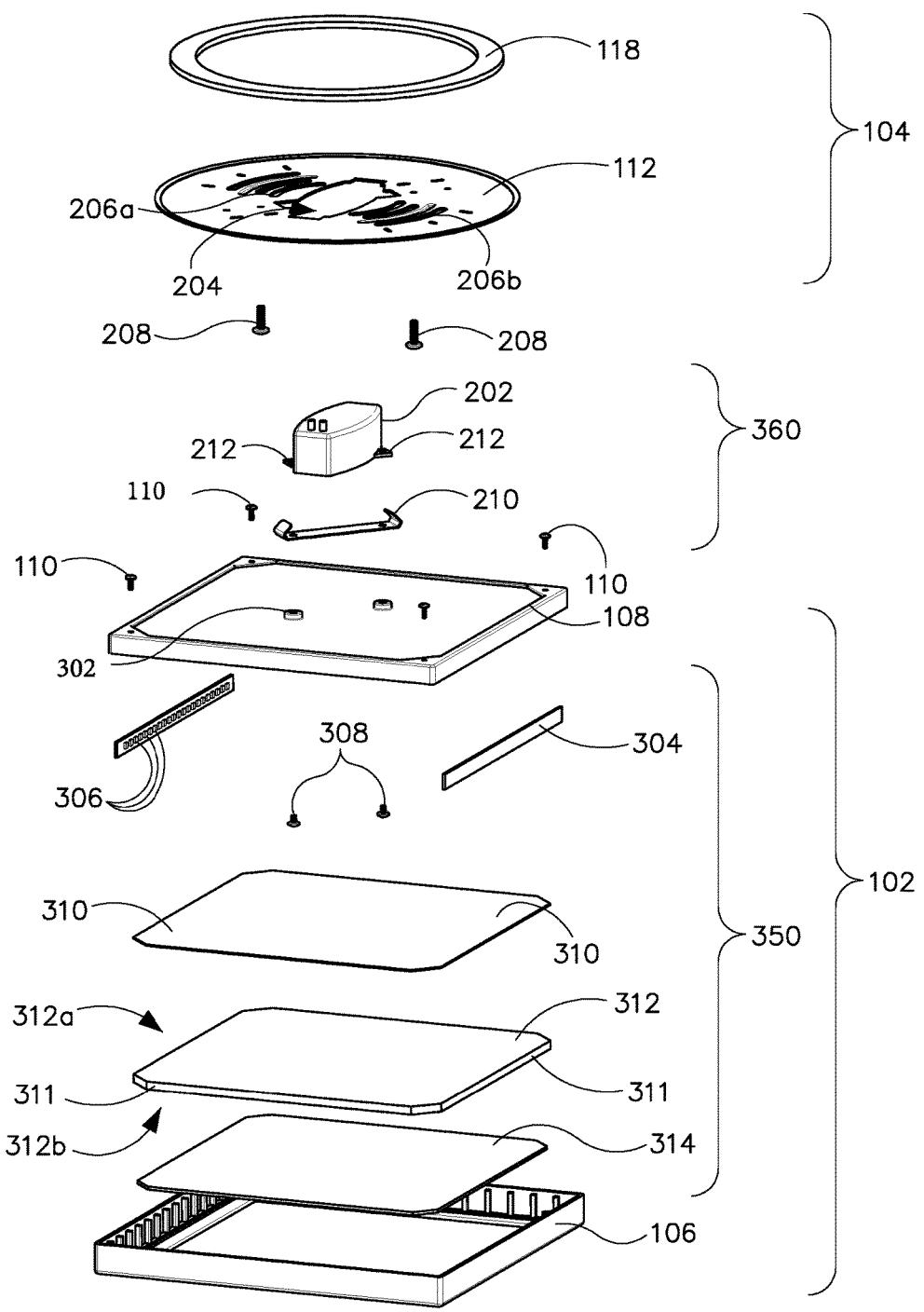
FIG. 3 illustrates an exploded view of the light fixture of FIG. 1 without the junction box, in accordance with an example embodiment of the present disclosure.
Figure 4:
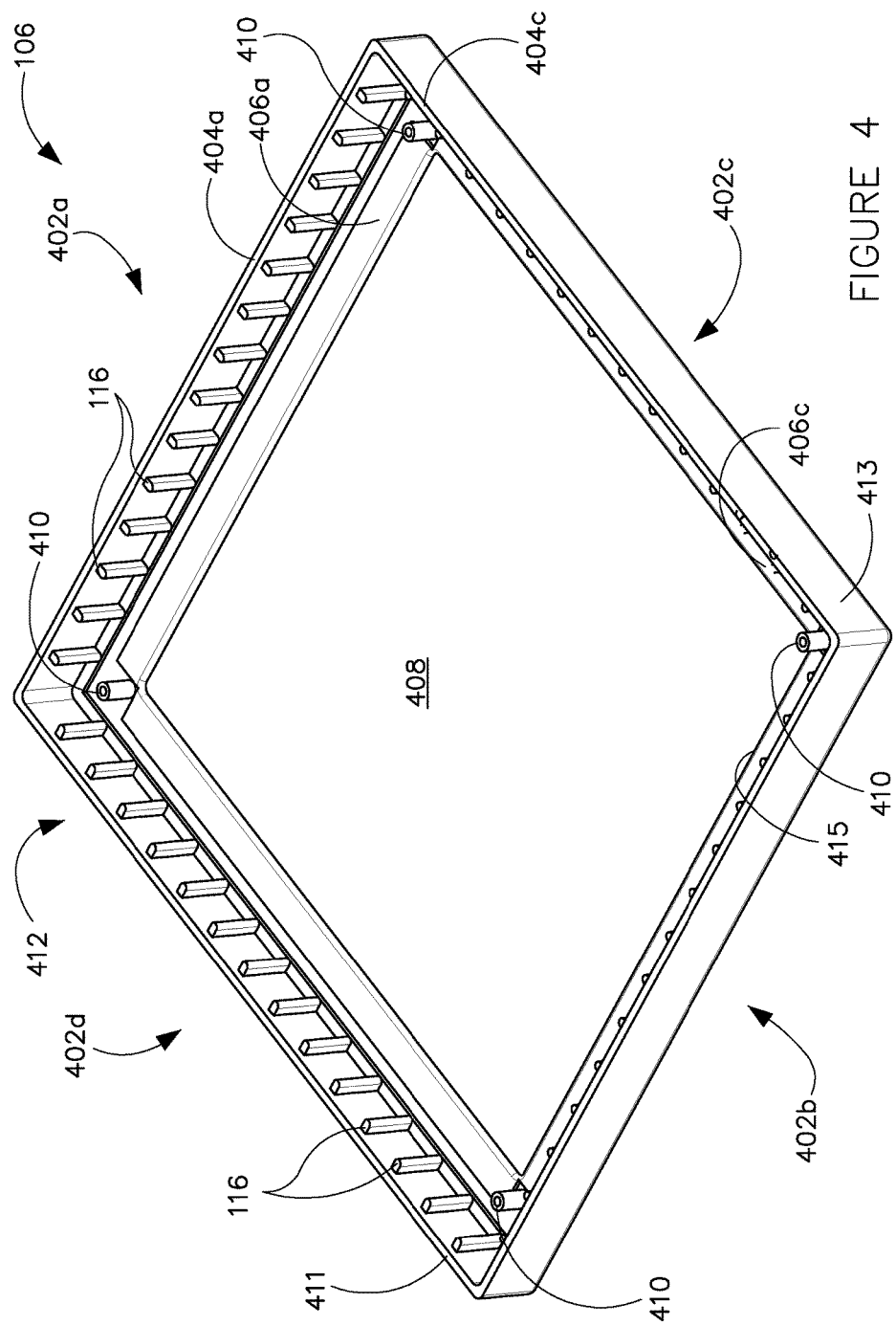
FIG. 4 illustrates a bottom housing member of the light fixture's housing assembly, in accordance with an example embodiment of the present disclosure.
Figure 5:
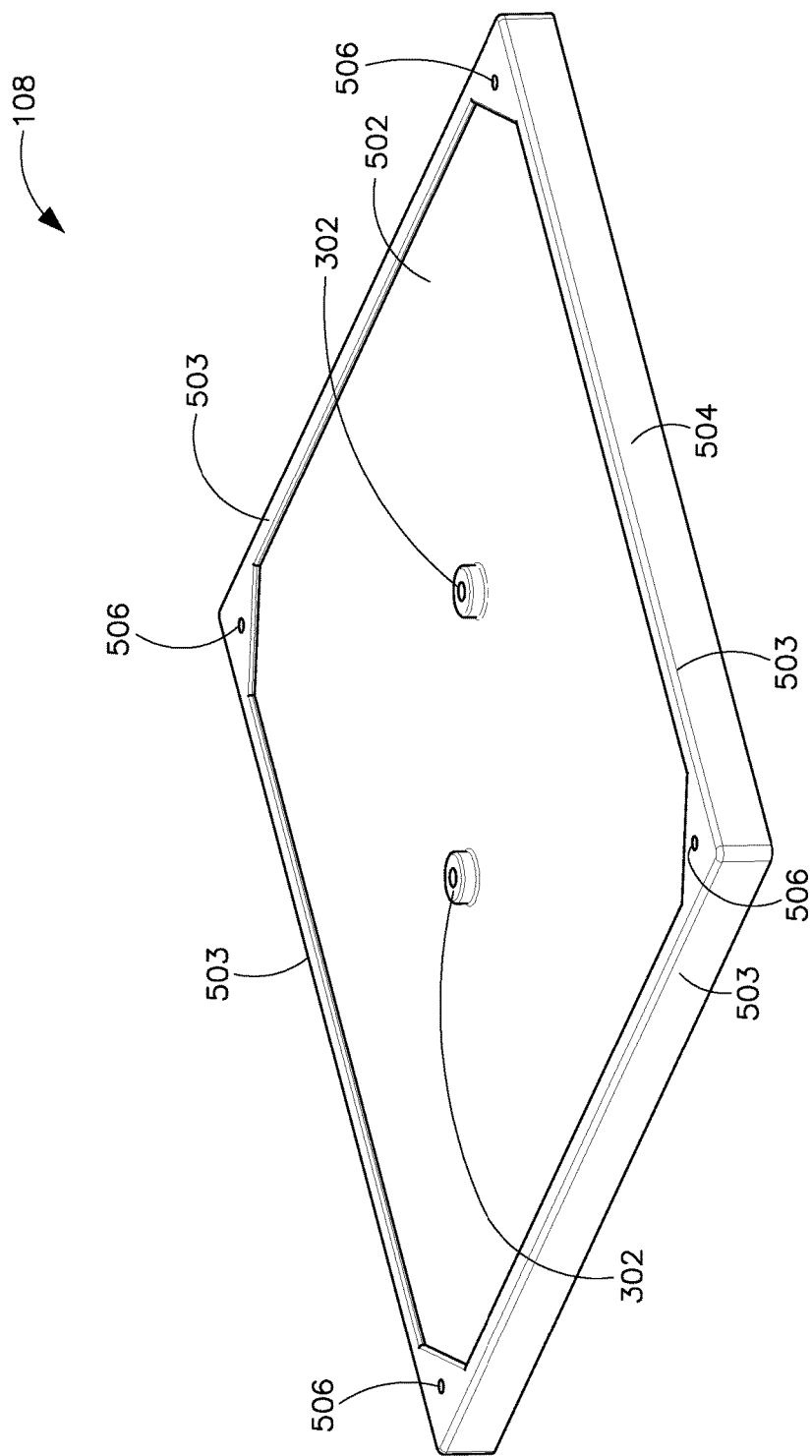
FIG. 5 illustrates a top housing member of the light fixture's housing assembly, in accordance with an example embodiment of the present disclosure.
Figure 6:
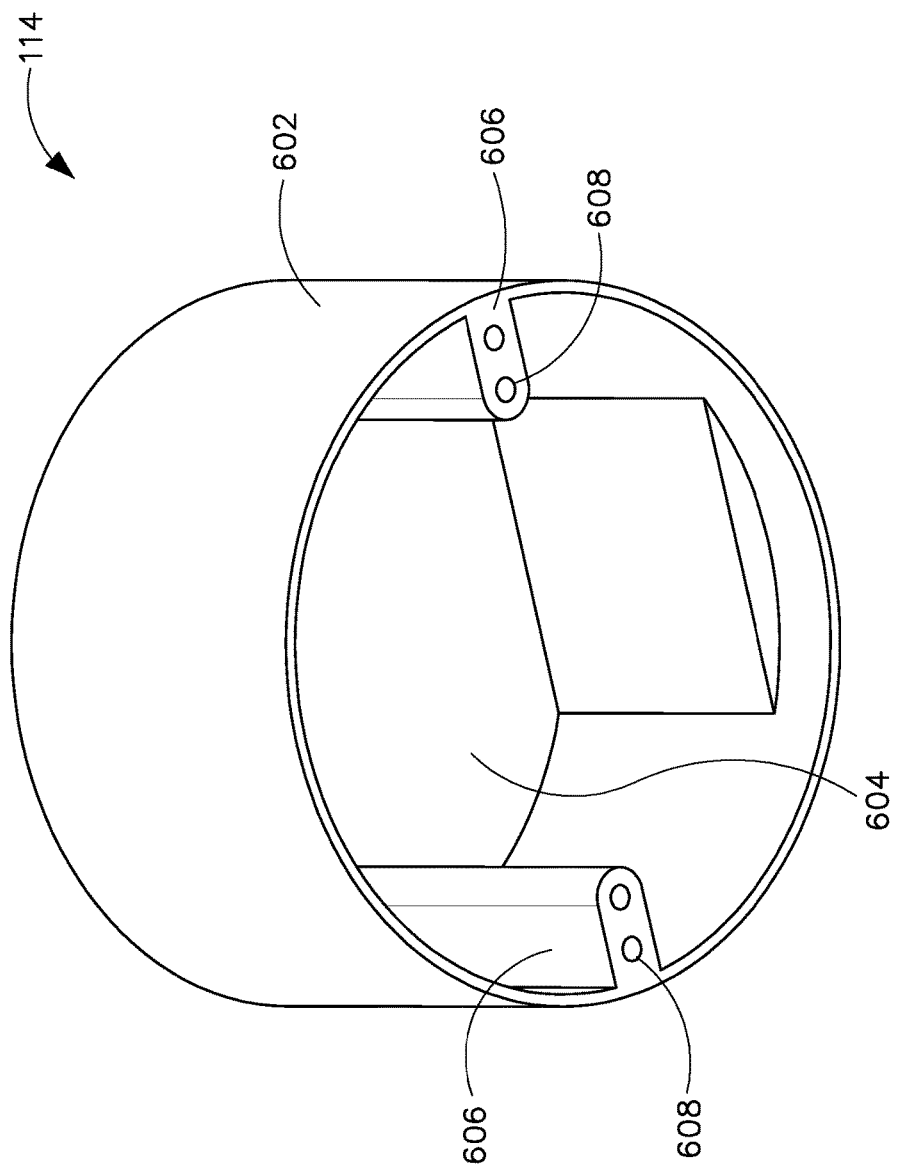
FIG. 6 illustrates a bottom perspective view of the junction box of FIG. 1, in accordance with an example embodiment of the present disclosure.
Figure 7:
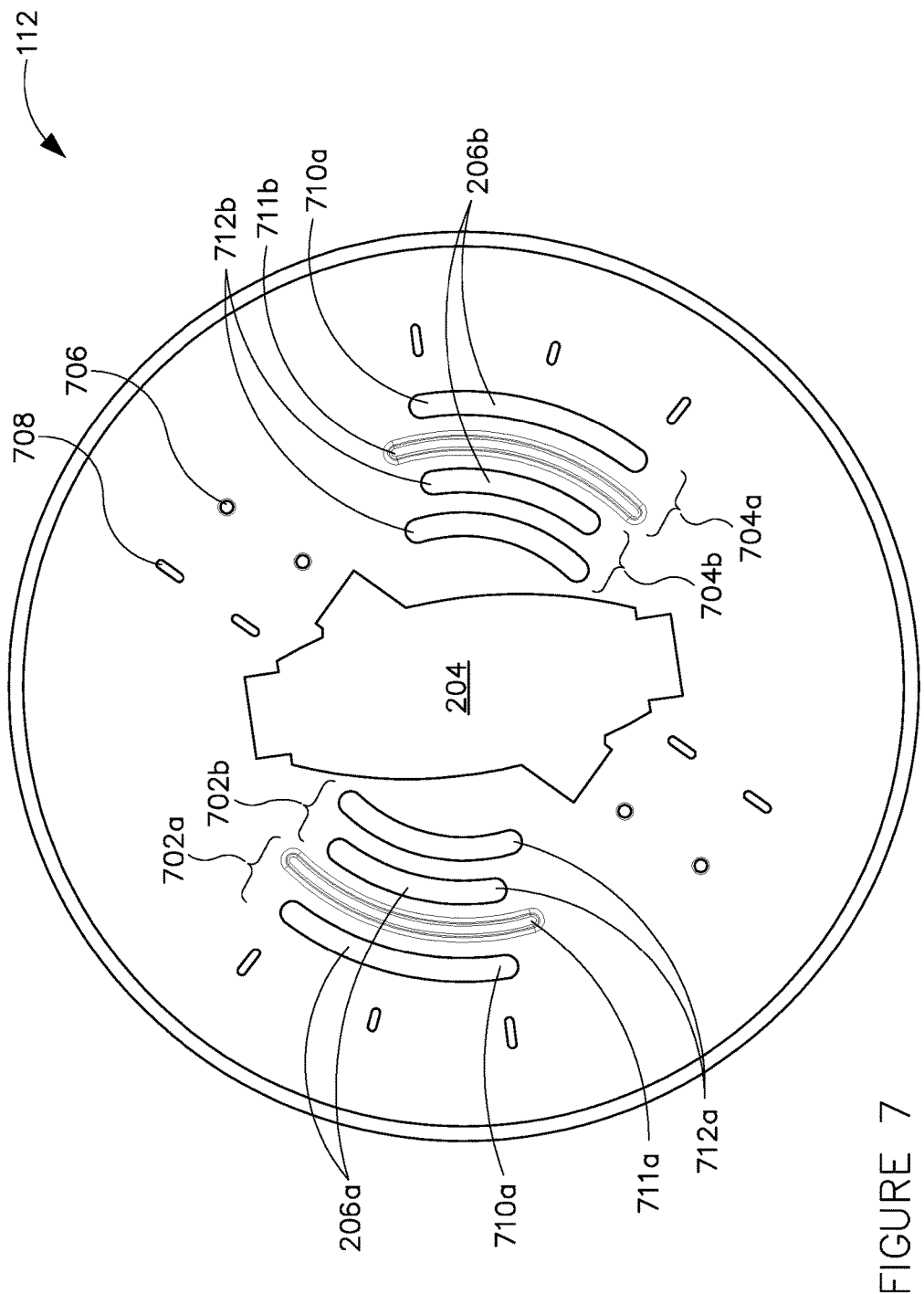
FIG. 7 illustrates a top view of a mounting plate of the light fixture of FIG. 1, in accordance with an example embodiment of the present disclosure.
Figure 8:
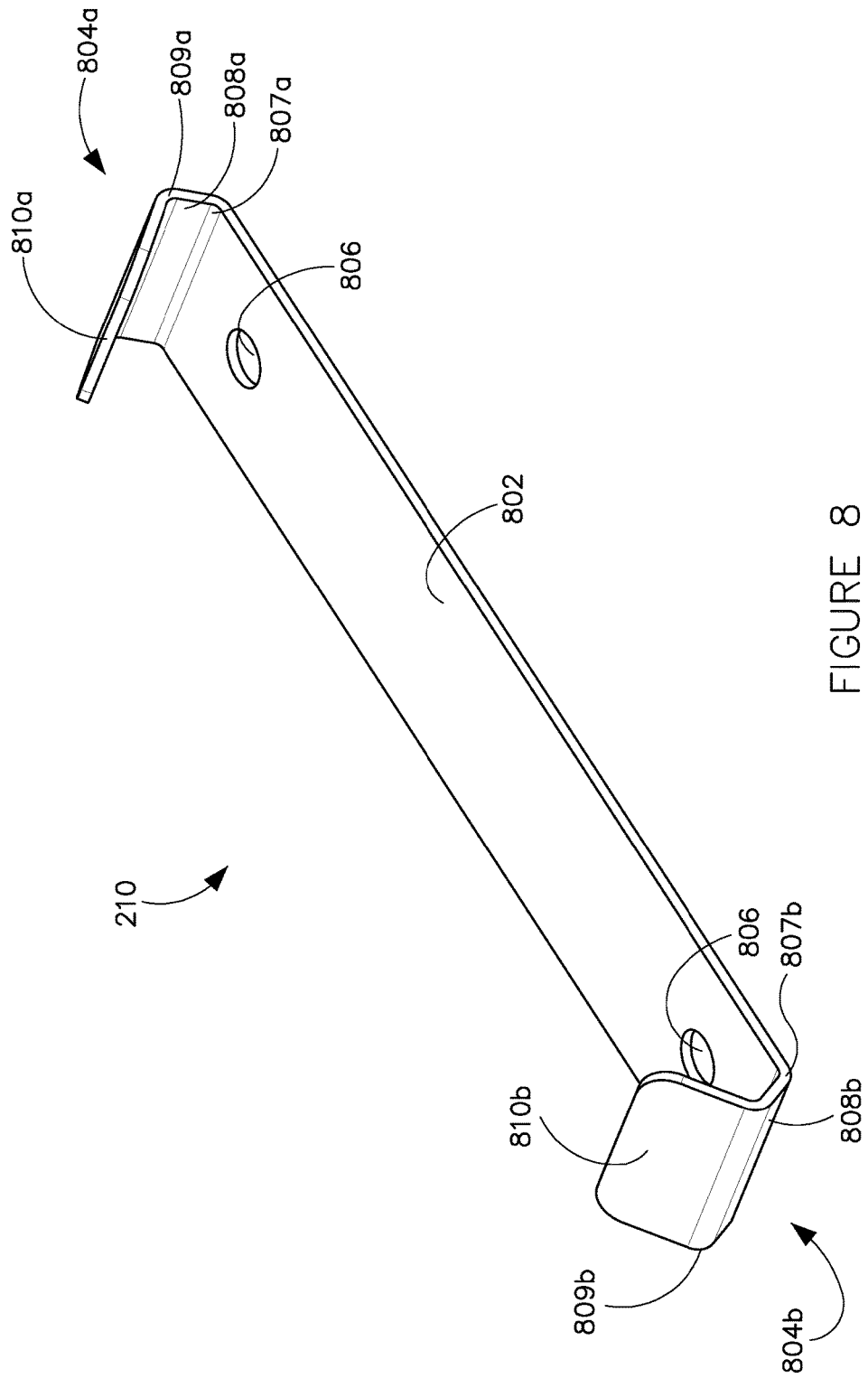
FIG. 8 illustrates a perspective view of a spring tab member of the light fixture of FIG. 1, in accordance with an example embodiment of the present disclosure.
Figure 9:
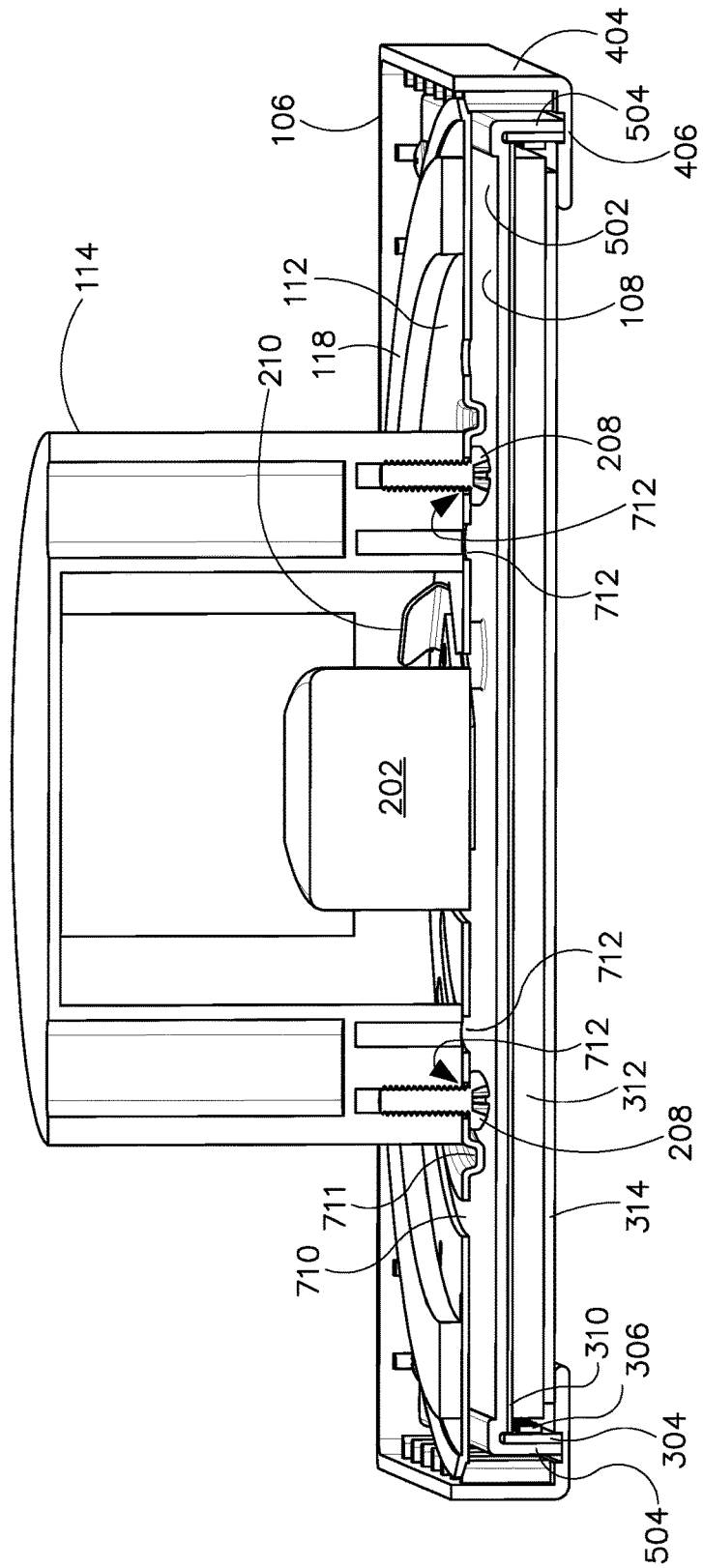
FIG. 9 illustrates a cross-sectional view of the light fixture of FIG. 1 along the X-X' axis, in accordance with an example embodiment of the present disclosure.
Figure 10:
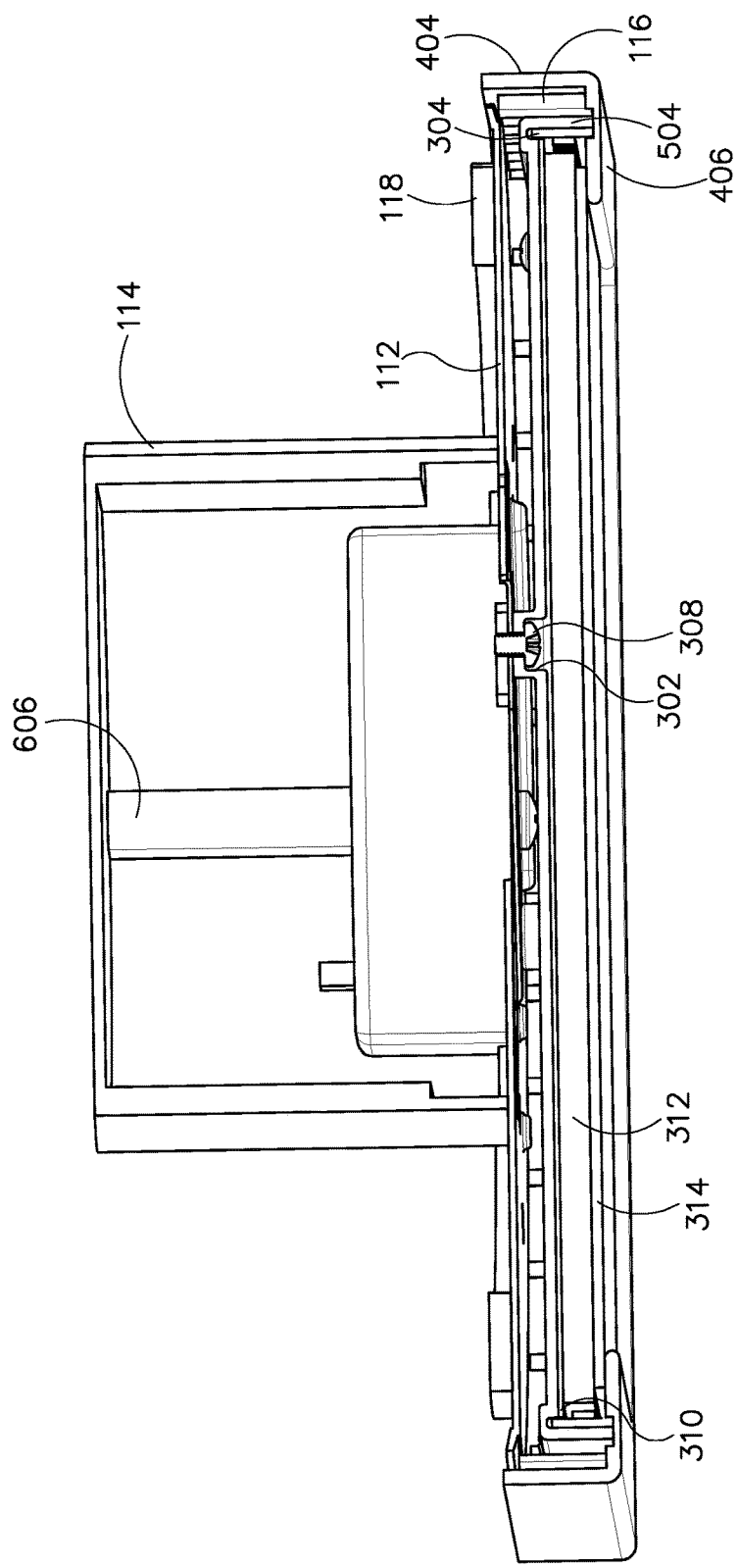
FIG. 10 illustrates a cross-sectional view of the light fixture of FIG. 1 along the X-X" axis, in accordance with an example embodiment of the present disclosure.

FIG. 1 illustrates a top perspective view of a light fixture mounted to a junction box, in accordance with an example embodiment of the present disclosure; FIG. 2 illustrates a top perspective view of the light fixture of FIG. 1 without the junction box, in accordance with an example embodiment of the present disclosure; FIG. 3 illustrates an exploded view of the light fixture of FIG. 1 without the junction box, in accordance with an example embodiment of the present disclosure; FIG. 4 illustrates a bottom housing member of the light fixture's housing assembly, in accordance with an example embodiment of the present disclosure; FIG. 5 illustrates a top housing member of the light fixture's housing assembly, in accordance with an example embodiment of the present disclosure; FIG. 6 illustrates a bottom perspective view of the junction box of FIG. 1, in accordance with an example embodiment of the present disclosure; FIG. 7 illustrates a top view of a mounting plate of the light fixture of FIG. 1, in accordance with an example embodiment of the present disclosure; FIG. 8 illustrates a perspective view of a spring tab member of the light fixture of FIG. 1, in accordance with an example embodiment of the present disclosure; FIG. 9 illustrates a cross-sectional view of the light fixture of FIG. 1 along the X-X' axis, in accordance with an example embodiment of the present disclosure; and FIG. 10 illustrates a cross-sectional view of the light fixture of FIG. 1 along the X-X" axis, in accordance with an example embodiment of the present disclosure.

Referring now to FIGS. 1-10, the light fixture 100 of the present disclosure may include a light module assembly 102, a driver assembly 360 (shown in FIG. 3), and/or a mounting assembly 104, where the driver assembly 360 and the mounting assembly 104 are disposed above and coupled to the light module assembly 102. The light module assembly 102 will be described in greater detail below in the following paragraphs.

a. Light Module Assembly

The light module assembly 102 may include a housing assembly 103 that is configured to house a light assembly 350 (shown in FIG. 3) of the light fixture 100. In particular, the housing assembly 103 includes a top housing member 108 and a bottom housing member 106 that are coupled to each other using one or more fasteners 110. The top housing member 108 and the bottom housing member 106 may be described in greater detail below in association with FIGS. 4 and 5.

Turning to FIG. 4, the bottom housing member 106 may include four side panels 402a-d that are arranged such that they form a substantially square shaped frame. Each side panel 402a-d may have a substantially L-shaped cross-sectional profile that is defined by a first wall 404 (comprising walls 404a-d) and a second wall 406 (comprising walls 406a-d). In particular, the first wall 404 and the second wall 406 may be substantially perpendicular to each other, and the second wall 406 and may extend inwards from a bottom edge 413 of the first wall 404, as illustrated in FIG. 4. Further, the bottom housing member 106 may have a top opening 412 that is defined by the top edges 411 of the side panels 402a-d (particularly, the first wall members 404), and a bottom opening 408 that is defined by the bottom edges 415 of the side panels 402a-d (particularly, the second wall 406). The top and bottom openings (412, 408) may be substantially square in shape, but the bottom opening 408 may have a smaller perimeter than the top opening 412. Furthermore, the bottom housing member 106 may include a plurality of support members 116 that extend inward from an inner surface of the each first wall 404a-d to provide additional support for the frame of the bottom housing member 106. The plurality of support members 116 may be substantially perpendicular to the first wall 404 and the second wall 406 of the side panel 402 and may extend from a top edge 411 of the first wall 404 towards the bottom edge 413 of the first wall. Additionally, as illustrated in FIG. 4, the bottom housing member 106 may include screw bosses 410 that are disposed at each corner of the bottom housing member 106. The screw bosses 410 may be configured to couple the bottom housing member 106 to the top housing member 108 as will be described below in greater detail.

Turning to FIG. 5, the top housing member 108 may include a substantially square shaped top surface 502 and a side wall 504 that extends substantially perpendicular to the top surface 502 from the perimeter of the top surface 502. The top housing member 108 may further include a plurality of coupling apertures 506 and one or more of driver coupling apertures 302 that are positioned on the top surface 502. As illustrated in FIG. 5, the plurality of housing coupling apertures 506 may be through apertures that are disposed at the corners of the top surface 502.

In certain example embodiments, to form the housing assembly 103, the top housing member 108 may be placed above the bottom housing member 106 such that: (a) the housing coupling apertures 506 of the top housing member 106 align with the screw bosses 410 of the bottom housing member 106, (b) the top housing member 108 covers at least a portion of the top opening 412 of the bottom housing member 106, and (c) the side wall 504 (bottom edge) of the top housing member 108 rests on the second wall 406 of the bottom housing member 106. Further, fasteners may be passed through each aligned housing coupling aperture 506 of the top housing member 108 and the respective screw boss 410 of the bottom housing member 106 to securely attach the top housing member 108 to the bottom housing member 106.

In particular, the perimeter of the top housing member 108, i.e., the top surface 502, may be smaller than the perimeter of the top opening 412, but larger than the perimeter of the bottom opening 408 of the bottom housing member 106. Accordingly, when the top housing member 108 is coupled to the bottom housing member 106, the side wall 504 of the top housing member 108 may be detached from the plurality of support structures 116 of the bottom housing member 108, as illustrated in FIG. 9. Further, when the top housing member 108 is coupled to the bottom housing member 106, a cavity that is configured to accommodate the light assembly 350 may be formed between the top housing member 108 and the bottom housing member 106.

Even though the present disclosure describes a specific shape and size of both the top housing member and the bottom housing member, one of ordinary skill in the art can understand and appreciate that in other example embodiments, the top housing member and the bottom housing member may have any other appropriate size and/or any other appropriate geometric or non-geometric shape without departing from a broader scope of the present disclosure. For example, the top housing member and the bottom housing member may be rectangular or circular in shape such that they define a rectangular or circular housing assembly. Alternatively, in some examples, the top housing member may have a different size and/or shape than the bottom housing member or vice-versa. Further, even though the present disclosure describes that the top housing member and the bottom housing member are coupled to each other using fasteners, one of ordinary skill in the art can understand and appreciate that in other example embodiments, the top housing member and the bottom housing member may be coupled to each other using any other appropriate coupling mechanisms without departing from a broader scope of the present disclosure. Alternatively, in some examples, the top housing member and the bottom housing member may be integral to each other. That is, the housing assembly may be a single integral structure that forms a cavity to accommodate the light module 350 rather than a multi-part structure. The light module 350 will be described in greater detail below in association with FIG. 3.

Turning to FIG. 3, the light assembly 350 may include a top reflector plate 310, a light guide 312, a lens 314, one or more circuit boards 304, and/or a plurality of light emitting diodes (LEDs) 306 disposed on each circuit board 304. In particular, the lens 314 of the light assembly 350 may be disposed on the second wall 406 of the bottom housing member 106 such that at least a portion of the lens 314 covers the bottom opening 408 of the bottom housing member 106. The lens 314 may be configured to diffuse and smoothen the light that passes through the lens 314 towards an area to be illuminated. Further, the lens 314 may have additional properties, such as a reflective property. For example, the lens 314 may be configured to reflect some of the light that is received by the lens 314. In certain example embodiments, the lens 122 may be fabricated from an acrylic material and may be substantially clear or translucent. Alternatively, the lens 122 may be formed using other suitable materials, such as glass, and can be, or made to be, opaque, if desired.

As described above, the light module 350 may further include a light guide 312 that may be disposed on top of the lens 312. The light guide 312 may include two major surfaces, i.e., a top surface 312a and a bottom surface 312b, and a plurality of side edges 311 extending between the top surface 312a and the bottom surface 312b. Furthermore, the light module 350 may include one or more circuit boards 304 that are attached to the inner surface of one or more side walls 504 of the top housing member 108 such that the plurality of LEDs 306 disposed on each circuit board 304 face a respective edge of the light guide 312. In particular, the light from the plurality of the LEDs 306 may enter into the light guide 312 through one or more side edges 311 of the light guide 312 and exit the light guide 312 through the top surface 312a and/or the bottom surface 312b. That is, the light from the LEDs 304 may enter the light guide through the edges 311 of the light guide 312 and may travel inside the light guide 312 (between the two major surfaces) though internal reflection of the light by the top surface 312a and the bottom surface 312b. The top and bottom surfaces 312a and 312b of the light guide may have features, such as etchings that allow at least a portion of the light that enters through the side edges 311 to exit through the top and bottom surfaces 312a and 312b of the light guide 312.

The light guide 312 may be disposed on the lens 314 such that the bottom surface 312b of the light guide 312 faces lens 314 and an area to be illuminated. So, light exiting through the bottom surface 312b may be directed to the area to be illuminated through the lens 314. However, the light exiting through the top surface 312a may be directed in an opposite direction of the area to be illuminated. Accordingly, a top reflector plate 310 may be disposed on the top surface 312a of the light guide 312 to capture the light exiting through the top surface 312a of the light guide and reflect it back into the light guide 312 such that the reflected light eventually exits through the bottom surface 312b of the light guide 312 and lens 314 towards the area to be illuminated.

In other words, the light guide 312 of the light module 350 may be disposed in the cavity formed by the housing assembly 103 such that the side edges 311 of the light guide are positioned adjacent the plurality the LEDs 306 attached to the side walls 504 of the housing assembly 103 (via the circuit board 304). Further, the light guide 312 is disposed between the top reflector plate 310 and the lens 314.

Even though the present disclosure describes the light module 350 as having a top reflector plate 310, a light guide 312, a lens 314, one or more circuit boards 304, and a plurality of light emitting diodes (LEDs) 306 disposed on each circuit board 304; one of ordinary skill in the art can understand and appreciate that in other example embodiments, the light module 350 may be fewer or more elements without departing from a broader scope of the present disclosure. For example, in some embodiments, the light module may not include the lens 314 and/or the light guide 312. Further, even though the present disclosure describes the light module 350 as having LEDs, one of ordinary skill in the art can understand and appreciate that in other example embodiments, the LEDs may be replaced by any other appropriate point or non-point light sources. For example, the LEDs 306 may be replaced by fluorescent tubes disposed along or adjacent the side walls 504 of the housing assembly 103. The following paragraphs will describe the driver assembly configured to power the light source of the light fixture in greater detail.

b. Driver Assembly

As illustrated in FIGS. 2, 3, 8, and 9, the light fixture 100 may further include a driver assembly 360 that is coupled to the housing assembly 103. The driver assembly 360 may include a spring tab member 210 and/or an LED driver 202. In particular, the spring tab member 210 and the LED driver 202 may be coupled to the top surface 502 of the top housing member 108 such that the spring tab member 210 is disposed in between the LED driver 202 and the top surface 502 of the top housing member 108.

As illustrated in FIG. 8, the spring tab member 210 may include an elongated planar base portion 802 (herein 'planar base portion 802') and two arms 804a and 804b that extend upwards from opposite ends (807a, 807b) of the planar base portion 802. The planar base portion 802 may include two driver coupling apertures 806 disposed adjacent the opposite ends (807*a*, 807*b*) of the planar base portion 802. Further, each arm 804 of the spring tab member 210 may include: (1) a lower bent portion 808*a, b* that extends up and outward from the end 807*a, b* of the planar base portion 802, and (2) an upper bent portion 810*a, b* that extends further up and inwards (towards the planar base portion 802) from an end 809*a, b* of the lower bent portion 808*a, b*. In other words, the lower bent portions (808*a* and 808*b*) of the two arms 804*a* and 804*b* may extend upwards and away from each other (in opposite directions), while, the upper bent portions (810*a* and 810*b*) of the two arms 804*a* and 804*b* may extend upwards and towards each other from the ends of the lower bent portion (808*a* and 808*b*). In certain example embodiments, at least one of the arms 804*a* and 804*b* may be flexible to securely retain a mounting plate 112 as will be described in greater detail below in association with the description of the mounting assembly 104.

In certain example embodiments, to couple the driver assembly 350 to the housing assembly 103, first, the spring tab member 210 may be placed on the top surface 502 of the top housing member 108 such that the driver coupling apertures 806 of the spring tab member 210 axially align with the driver coupling apertures 302 on the top surface 502 of the top housing member 108. Then, the LED driver 202 may be positioned on top of the spring tab member 210 such that: (1) a body of the LED driver 202 is disposed in between the two arms 804*a* and 804*b* of the spring tab member 210, and (2) the notches and/or apertures on the two coupling tabs 212 that extend from opposite sides of the LED driver body axially align with the driver coupling apertures 806 of the spring tab member 210. In certain example embodiments, the outer edges of the coupling tabs 212 may include a notch that aligns with at least a portion of the respective driver coupling apertures 806 of the spring tab member 210. Alternatively, in other example embodiments, each coupling tab 212 of the LED driver 202 may include through apertures. In either case, the LED driver 202, the spring tab member 210, and the top housing member 108 may be arranged such that: (1) the apertures or notches in the coupling tabs 212 of the LED driver 202, the driver coupling apertures 806 of the spring tab member 210, and the driver coupling apertures 302 on the top surface 502 of the top housing member 108 are axially aligned, and (2) the spring tab is disposed in between the LED driver 202 and the top housing member 108. Further, fasteners 308 may be passed through the axially aligned apertures of the LED driver coupling tabs 212, the spring tab member 210, and the top housing member 108 to securely couple the driver assembly 260 to the housing assembly 103.

Even though the present disclosure describes the driver assembly 360 as having the spring tab member 210, one of ordinary skill in the art can understand and appreciate that in other example embodiments, the spring tab member may be omitted without departing from a broader scope of the present disclosure. In an embodiment that does not include the spring tab member 210, the LED driver 202 may be directly coupled to the top surface 502 of the top housing member 108 and the mounting assembly 104 may be coupled to the light module assembly 102 using any other appropriate coupling mechanism. The mounting assembly 104 will be described in greater detail in the following paragraphs.

c. Mounting Assembly

As described above, the light fixture 100 may include a mounting assembly 104 that is configured to be securely coupled to the light module assembly 102. In particular, the mounting assembly 104 may include a mounting plate 112 and/or an additional ring 118 that is disposed on the mounting plate 112. In certain example embodiments, the mounting plate 112 may be a circular disc shaped member, however, in other example embodiments, the mounting plate 112 may have any other appropriate geometric or non-geometric shape without departing from a broader scope of the present disclosure. For example, the mounting plate may be substantially similar to the shape of the housing assembly 103, i.e., square in shape.

As illustrated in FIGS. 1-3, 7, and 9-10, the mounting plate 112 may include a central aperture 204 and a plurality of elongated curved slots 206*a, b* (hereinafter 'curved slots', but also interchangeably referred to as 'elongated slots'). The central aperture 204 may be configured to receive and axially accommodate the driver 202 and/or the spring tab member 210. In certain example embodiments, the mounting plate 112 may be disposed on and securely coupled to the housing assembly 103 of the light module assembly 102 without any tools. For example, as illustrated in FIGS. 1-3, 7, and 9-10, the mounting plate 112 may be securely coupled to the top surface 502 of the housing assembly 103 via the spring tab member 210 that allows the mounting plate 112 to snap lock to the top surface 502 of the housing assembly 103. In particular, to securely couple the mounting plate 112 to the housing assembly 103, the mounting plate 112 may be placed above the top surface 502 of the housing assembly 103 such that the central aperture 204 of the mounting plate 112 is axially aligned with the driver 202 and the spring tab member 210 that is attached to the driver 202. Further, the mounting plate 112 may be pushed downwards such that a portion of the mounting plate edges that define the central aperture 204 engages the upper bent portions 810*a* and 810*b* of the spring tab member's arms 804*a* and 804*b*. When the mounting plate 112 is pushed down, the upper bent portions 810*a* and 810*b* of the spring tab member's arms 804*a* and 804*b* may flex to let the mounting plate 112 slide down and engage the lower bent portion 808*a* and 808*b* of the two arms 804*a* and 804*b*, e.g., like a snap-on mechanism, such that the mounting plate 112 is securely locked to the housing assembly 103.

However, in other example embodiments, the mounting plate 112 may be securely coupled and locked to the housing assembly 103 using any other appropriate coupling mechanisms without departing from a broader scope of the present disclosure. For example, the mounting plate 112 may be coupled to the housing assembly 103 or any other portion of the light module assembly 102 using fasteners, e.g., via apertures 706 and/or slots 708. In another example, the apertures 706 and slots 708 may be configured to attach any other mounting device, such as a friction blade 2002 to the mounting plate 112, as will be described in greater detail below in association with FIGS. 20 and 21. Alternatively, in another example, the housing assembly may have grooves along its sides to receive (snap on) the mounting plate 112 (e.g., square shaped mounting plate (substantially similar to the shape of the top surface 502 of the housing assembly 103)) for securely coupling and locking the mounting plate 112 to the light module assembly 102.

As described above, in addition to the central aperture 204, the mounting plate 112 may include the plurality of curved slots 206*a, b*. In particular, the plurality of curved slots may be configured as two sets of curved slots 206*a* and 206*b* disposed on opposite sides of the central aperture 204, as illustrated in FIG. 7. Each set of curved slots 206*a* or 206*b* may include two pairs of curved slots, i.e., an inner pair of curved slots and an outer pair of curved slots. In the example embodiment illustrated in FIG. 7, the first set of curved slots 206a include an inner pair of curved slots 702b and an outer pair of curved slots 702a, and similarly, the second set of curved slots 206b may include another inner pair of curved slots 704b and another outer pair of curved slots 704a.

Each inner pair of curved slots 702b and 704b may include two installation slots 712a and 712b, respectively, whereas, each outer pair of curved slots 702a or 704a may include one installation slot 710a, b and one receiving slot 711a, b. The installation slots 712a, b and 710a, b may be through slots, while, the receiving slot 711a, b may be a blind slot. Further, the size of the curved slots in each set may increase from the inner pair of curved slots 702b or 704b to the outer pair of curved slots 702a or 704a. That is, the outer pair of curved slots 702a and 704a may be longer than the inner pair of curved slots 702b and 704b. The different pairs of curved slots extending outward from the central aperture 204 allow the light fixture 100 to be mounted to junction boxes or recessed cans of different sizes. For example, the inner pair of curved slots 702b or 704b may be configured to mount or attach the light fixture 100 to a recessed can having a five inch diameter and/or a junction box having a first diameter, while, the outer pair of curved slots 702a or 704a may be configured to mount or attach the light fixture 100 to a recessed can having a six inch diameter and/or a junction box having a larger second diameter.

Even though the present disclosure describes the mounting plate as having two sets of curved slots where each set includes two pairs of curved slots, one of ordinary skill in the art can understand and appreciate that in other example embodiments, the mounting plate may have fewer or more curved slots that are configured to mount the light fixture to recessed cans and junction boxes having larger or smaller openings without departing from a broader scope of the present disclosure. For example, each set of curved slots of the mounting plate may have more than two pairs of curved slots that allow the light fixture to be coupled to a recessed can or junction box having a first diameter opening, a second diameter opening, or a third diameter opening. Furthermore, in some examples, the mounting plate 112 may have only one set of curved slots on one side of the central aperture rather than on two opposite sides of the central aperture without departing from a broader scope of the present disclosure. Additionally, one of ordinary skill in the art can understand and appreciate that, in some example embodiments, the shape, size, and location of the curved slots may vary from that of FIG. 7 without departing from a broader scope of the present disclosure.

Turning to FIG. 6, an example junction box 114 may be a cylindrical structure that is open on one end. The junction box 114 may include a top surface 604, a side wall 602 extending from the perimeter of the top surface 604, and a plurality of screw bosses 606 disposed on the inner surface of the side wall 602. Further, each screw boss 606 may include one or more apertures 608. In particular, the junction box 114 may be coupled to the mounting plate 112 by: (1) placing the junction box 114 above the mounting plate 112 such that the screw boss apertures 608 on opposite sides of the junction box 114 may be axially aligned with the installation slots 712 of the inner pair of curved slots (702b, 704b), and (2) passing fasteners 208 (e.g., screws) through the aligned installation slots 712 of the mounting plate and screw boss apertures 608 of the junction box 14, as illustrated in FIGS. 2, 3, 9, and 10. Even though FIGS. 2, 3, 9, and 10 illustrate the junction box apertures 608 as being aligned with the installation slots 712 of the inner pair of curved slots (702b, 704b), one of ordinary skill in the art can understand and appreciate that in some other example embodiments where the junction box has a larger diameter, said junction box may be coupled to the mounting plate via the installation slots 710 of the outer pair of curved slots (702a, 704a) without departing from a broader scope of the present disclosure.

In certain example embodiments, to mount the light fixture 100 to the junction box 114, first, the junction box 114 may be coupled to the mounting plate 112 as described above using two fasteners 208. Then, the mounting plate 112 with the coupled junction box 114 may be snapped onto the light module assembly 102 via the spring tab member 210 to securely couple and lock the junction box 114 to the light module assembly 102. Once the light fixture 100 is mounted to the junction box 114 as described above, the light fixture 100 may be rotated clockwise or counterclockwise with respect to the junction box 114 to adjust an orientation of the light fixture 100. For example, once the light fixture 100 is mounted to the junction box 114 in a room, the orientation of the light fixture 100 may be such that the edges of the light fixture (e.g., housing assembly 103) are at an angle with the edges (walls) of the room. This may not be visually appealing to a customer. Conventional mounting assemblies may not allow the light fixture to be rotated such that the edges of the light fixture may be aligned with the edges of a room. However, the mounting assembly 104 of the present disclosure allows the light module assembly 102 of the light fixture 100 to be rotated either clockwise or counterclockwise with respect to the junction box 114 and about an axis that is normal to and passing through the center of the substantially square shaped light module assembly 102 such that the edges of the light fixture 100 may be aligned with the edges of a room in which the light fixture is installed.

In particular, the mounting plate 112 may be rotated about the curved slots, i.e., the installation slots 710a, b or 712a, b, which in turn rotates the light module assembly 102 that is securely locked to the mounting plate 102. When the light fixture 100 mounted to the junction box 114 is rotated about an axis that is normal to and passing through the center of the substantially square shaped light module assembly 102, the fasteners (screws) 208 passing through the installation slots (710a, b or 712a, b) of the mounting plate 112 may move or slide along the installation slots (710a, b or 712a, b) from one end to an opposite end of the installation slots (710a, b or 712a, b). In other words, to rotate the light fixture 100, the mounting plate 112 of the light fixture 100 moves about the fasteners 208 and along the length of the installation slots 710a, b or 712a, b through which they pass. Accordingly, the length of the installation slots 710a, b or 712a, b may determine the degree of rotation that is allowed in the clockwise or counterclockwise direction. In one example, the installation slots 710a, b and/or 712a, b may be configured to allow the light fixture 100 to rotate 0 to 90 degrees in the clockwise or counterclockwise direction. However, in other examples, the installation slots 710a, b and/or 712a, b may be configured to allow the light fixture 100 to rotate more than 90 degrees without departing from a broader scope of the present disclosure.

Even though FIGS. 1, 6, 9, and 10 illustrate the light fixture 100 as being mounted directly to a junction box 114, in other example embodiments, the light fixture 100 may be mounted to a recessed can using torsion springs and torsion spring brackets without departing from a broader scope of the present disclosure. An example embodiment of a light fixture 100 with torsion spring brackets may be described below in greater detail in association with FIGS. 11-14.

II. Recessed Mounting Using Torsion Springs and Torsion Spring Brackets

Figure 11:
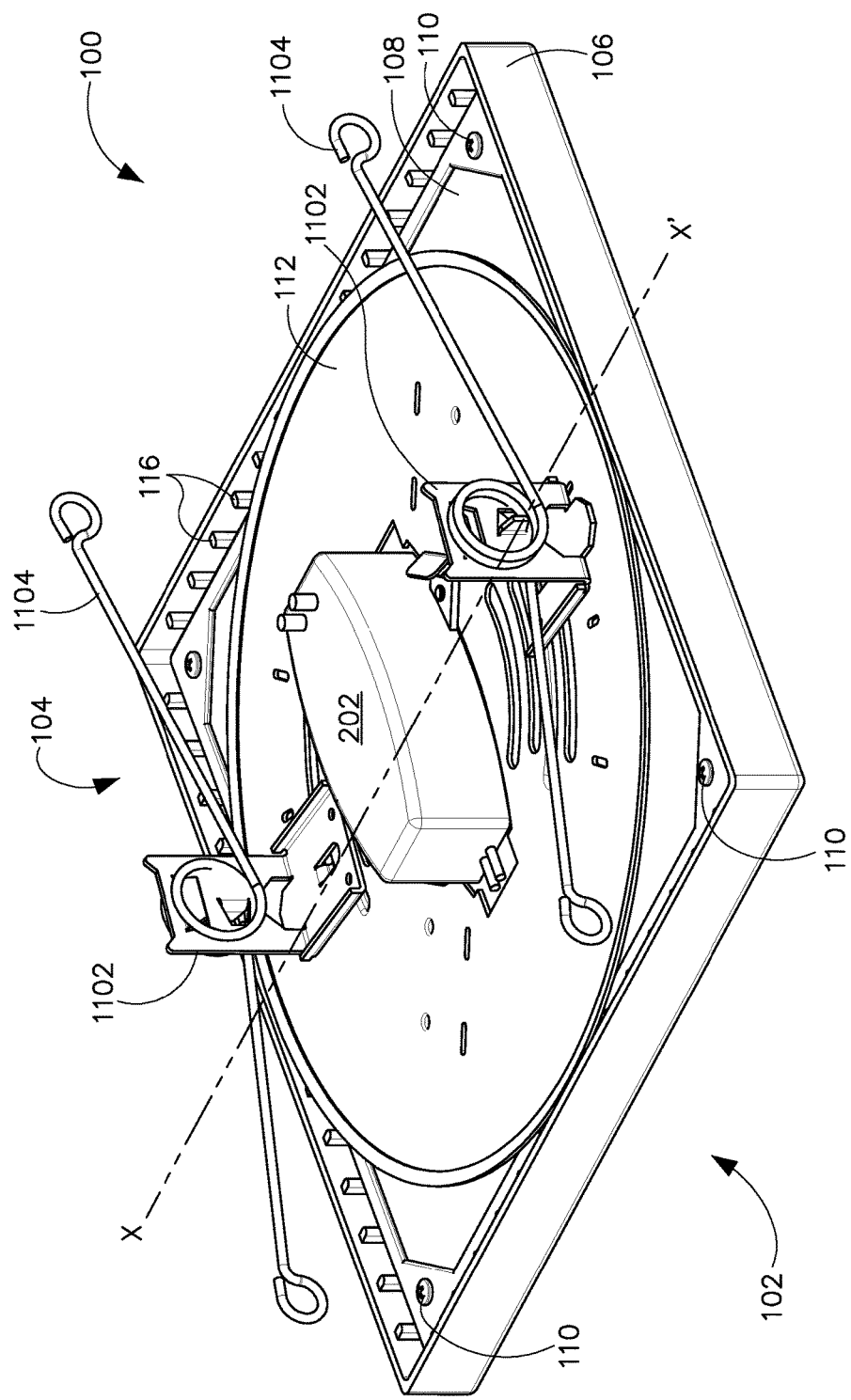
FIG. 11 illustrates a top perspective view of a light fixture that is configured to be mounted to a recessed can, in accordance with an example embodiment of the present disclosure.
Figure 12:
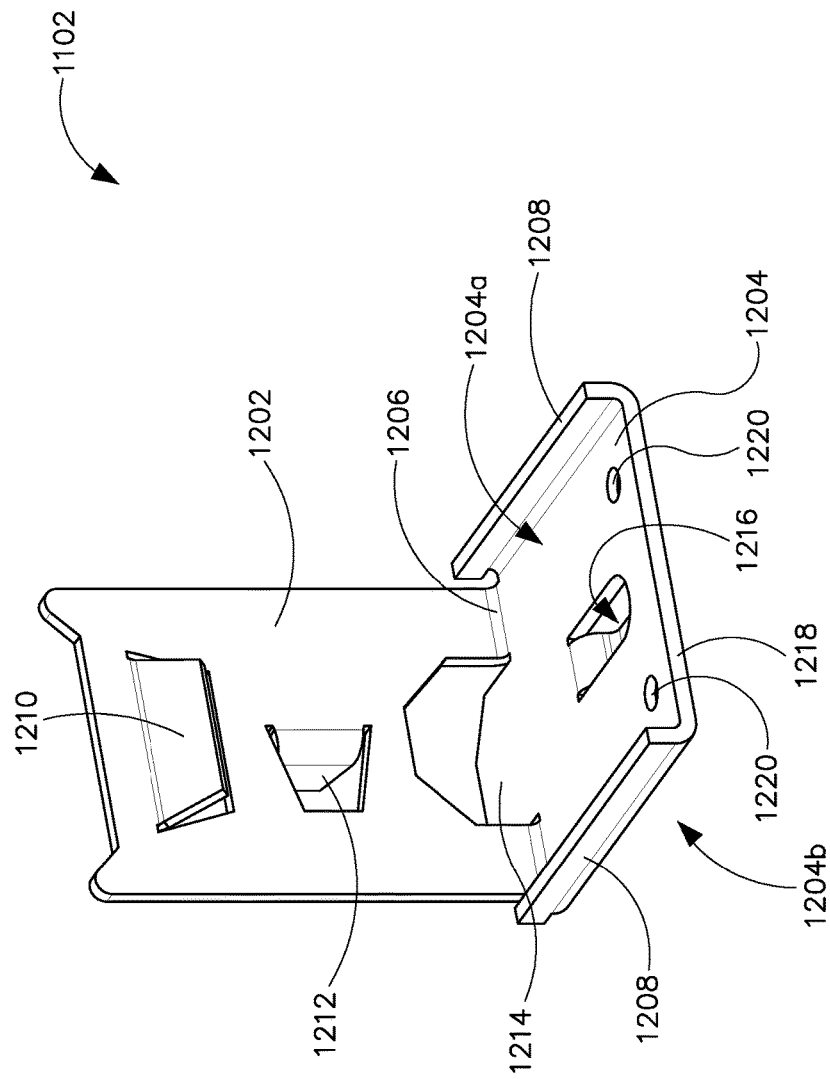
FIGS. 12 and 13 illustrate a perspective view and a side view of a torsion spring bracket, in accordance with an example embodiment of the present disclosure.
Figure 13:
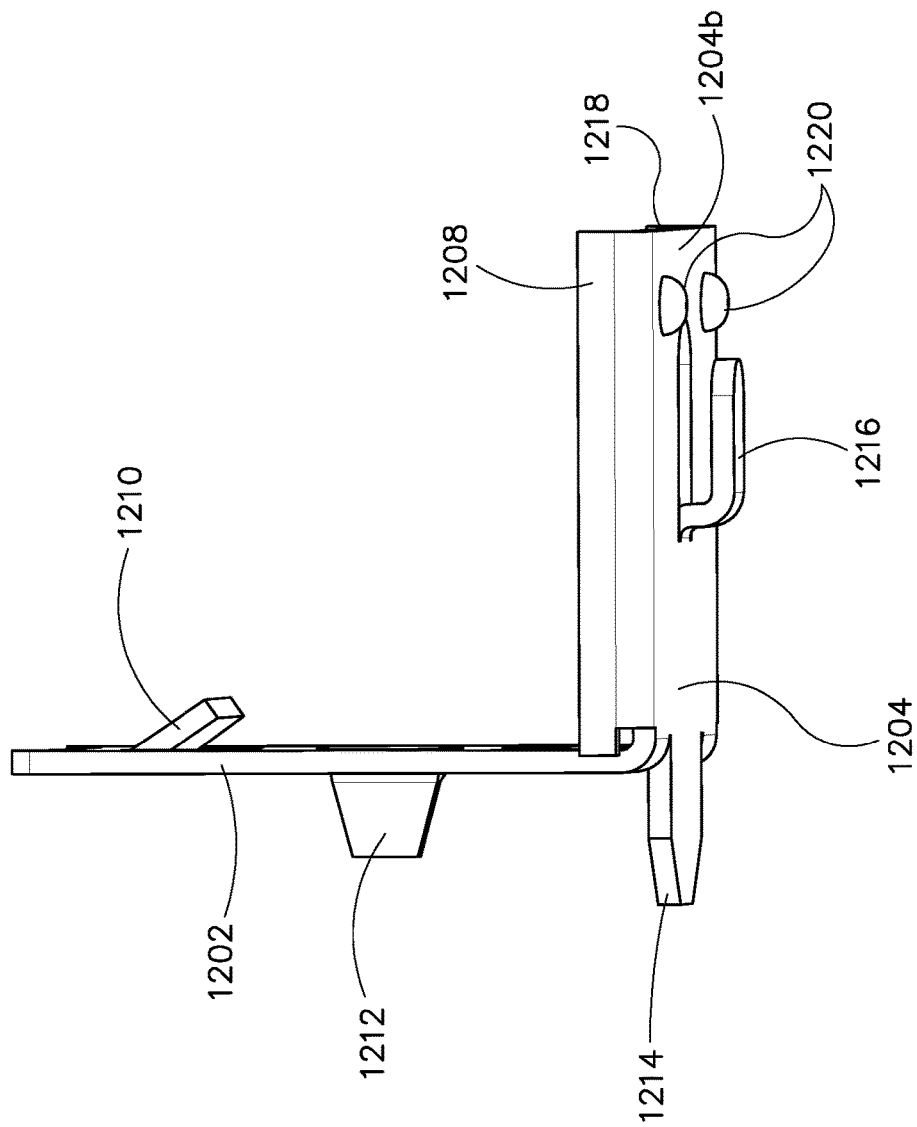
Figure 14:
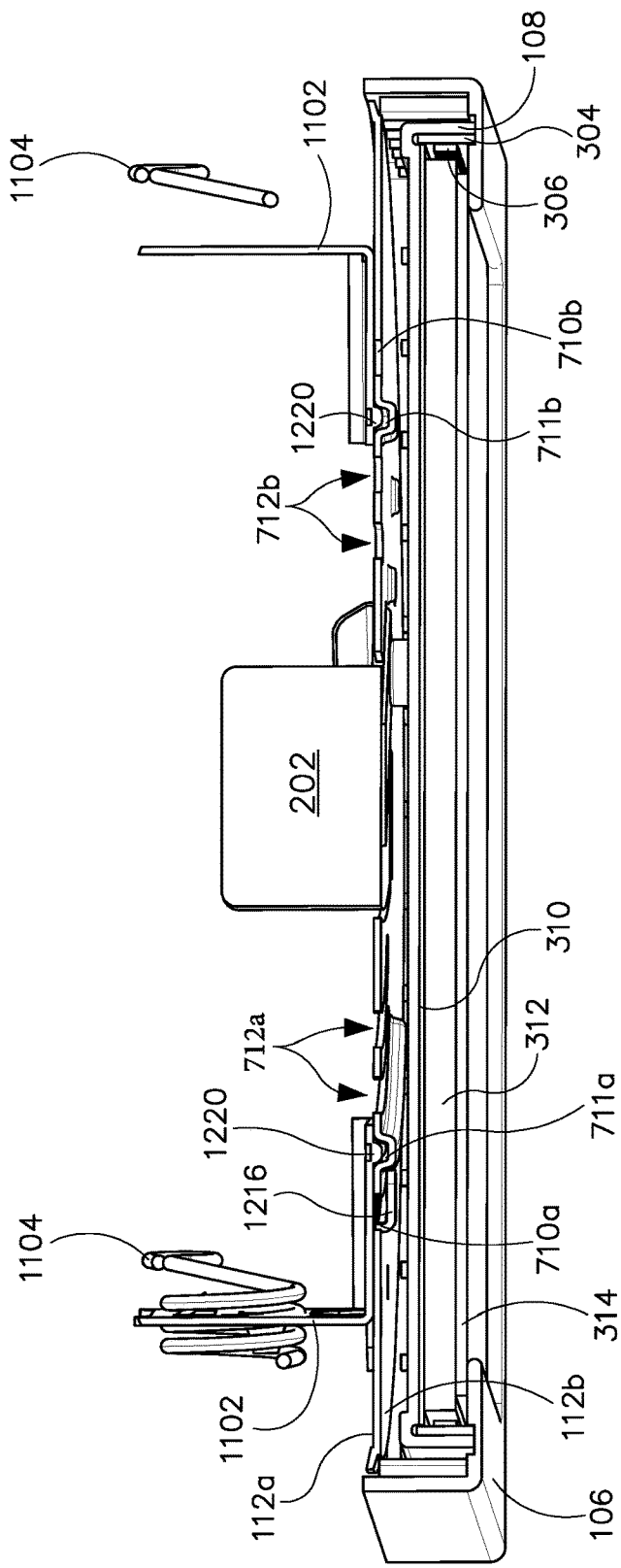
FIG. 14 illustrates a cross-sectional view of the light fixture of FIG. 11 along the X-X' axis, in accordance with an example embodiment of the present disclosure.

FIG. 11 illustrates a top perspective view of a light fixture that is configured to be mounted to a recessed can, in accordance with an example embodiment of the present disclosure; FIGS. 12 and 13 illustrate different perspective views of a torsion spring bracket, in accordance with an example embodiment of the present disclosure; and FIG. 14 illustrates a cross-sectional view of the light fixture of FIG. 11 along the X-X' axis, in accordance with an example embodiment of the present disclosure.

At the outset, it is noted that the light module assembly 102, the driver assembly 360, and the mounting plate 112 of the light fixture 100 illustrated in FIG. 11 may be substantially similar to that in FIGS. 1-10. Further, since the light module 102, driver assembly 360, and the mounting plate 112 are described above in association with FIGS. 1-10, their description will not be repeated herein for the sake of brevity. In other words, in order to simplify the description herein, only the portion/elements of FIGS. 11-14 that are different FIGS. 1-10 will be described in the following paragraphs.

Accordingly, referring now to FIGS. 11-14, in addition to the mounting plate 112, the mounting assembly 104 may include a pair of torsion spring brackets 1102 that are configured to toollessly couple to the mounting plate 112. In particular, the torsion spring bracket 1102 may include a first planar portion 1202 that has one or more torsion spring coupling tabs 1210 and 1212 that are configured to engage and retain a torsion spring 1104. Further, the torsion spring bracket 1102 may include a second planar portion 1204 that comprises toolless coupling features 1216 and 1220 that allow the torsion spring bracket 1102 to toollessly couple with the mounting plate 112. Furthermore, the torsion spring bracket 1102 may include a support tab 1214 that extends substantially perpendicular to the first planar portion 1202 and substantially parallel to the second planar portion 1204 in a direction that is opposite to the second planar portion 1204. The second planar portion 1204 may extend substantially perpendicular to the first planar portion 1202 from a lateral end 1206 of the first planar portion 1202 such that the torsion spring bracket 1102 has a substantially L-shaped side profile.

As illustrated in FIGS. 12 and 13, the support tab 1214 may be partially cut and bent out from the first planar portion 1202 adjacent the lateral end 1206 of the first planar portion 1202 that converges with the second planar portion 1204. Similarly, the torsion spring coupling tabs 1210 and 1212 of the first planar portion 1202 may be partially cut and bent out from the first planar portion 1202 such that they can securely retain the torsion spring 1104.

The toolless coupling features of the torsion spring bracket 1102 may include a tongue feature 1216 that is partially cut and bent out from the second planar portion 1204 such that it extends downwards from the second planar portion 1204 in a plane below and substantially parallel to the second planar portion 1204. In addition to the tongue feature 1216, the toolless coupling features of the torsion spring bracket 1102 may include one or more retention features 1220 that are positioned adjacent a lateral end 1218 of the second planar portion 1204 and extend downward from a bottom surface 1204b of the second planar portion 1204. The one or more retention features 1220 may include, but are not limited to, dimple features, half shear features, semi-pierced lace features, etc.

In particular, as depicted in FIGS. 11 and 14, to toollessly couple the torsion spring bracket 1102 to the mounting plate 112, the tongue feature 1216 of the torsion spring bracket 1102 is inserted through the installation slot 710 of the outer pair of curved slots (702a or 704a) and subsequently the torsion spring bracket 1102 is rotated upwards by approximately 90 degrees until: (a) the top surface of the tongue feature 1216 biases a bottom surface 112b of the mounting plate 112, (b) the support tab 1214 of the torsion spring bracket 1102 biases the top surface 112a of the mounting plate 112, and (c) the retention features 1220 of the torsion spring bracket "fall" into or are received within a receiving slot of the respective outer pair of curved slots (702a or 702b). Steps a-c described above may toollessly secure the torsion spring bracket 1102 in position with the mounting plate 112 and prevent the torsion spring bracket 1102 from rotating back out of position. Further, as described above, the torsion spring 1104 may be attached to the torsion spring bracket 1102 via the torsion spring coupling tabs 1210 and 1212. Then, as described above in association with the junction box mounting of the light fixture, the mounting plate 112 with the coupled torsion spring brackets 1102 (and torsion spring 1104) may be coupled to or snapped onto the light module assembly 102 using the spring tab member 210 to securely lock the mounting plate 112 to the light module assembly 102.

Once the light module assembly 102 is securely coupled to the mounting plate 112 with the torsion spring brackets 1202 and their corresponding torsion springs 1104, the light fixture 100 may be mounted or installed in a recessed can (not shown). In particular, when installing the light fixture 100 in the recessed can, the prongs (two arms) of the torsion spring 1104 are pinched together and inserted through spring receivers between the two hooked ends of the torsion spring 1104. The prongs are then allowed to spread out into their neutral position, biasing the two hooked ends. As the prongs spread outward, the light fixture 100 may be pulled upward (towards the recessed can) until a perimeter of the light fixture grips or is pulled against an edge of the recessed can or the ceiling, thereby securely mounting the light fixture 100 within the recessed can.

Even though the example light fixture embodiment of FIGS. 11 and 14 illustrate the torsion spring brackets 1102 being coupled to the mounting plate 112 via the outer pair of curved slots 702a and 704a, one of ordinary skill in the art can understand and appreciate that the torsion spring brackets 1102 may be coupled to the mounting plate 112 via the inner pair of curved slots 702b and 704b without departing from a broader scope of the present disclosure. For example, when the light fixture 100 is to be mounted within a recessed can having a smaller diameter, i.e., five inch diameter, the torsion spring brackets 1102 may be coupled to the mounting plate 112 via the inner pair of curved slots 702b and 704b. Further, even though the present disclosure describes the curved slots of the mounting plate 112 as being configured to mount the light fixture to recessed cans having five or six inch diameters, one of ordinary skill in the art can understand and appreciate that in other example embodiments, the curved slots of the mounting plate may be configured to mount the light fixture within recessed cans having smaller or larger diameter than that described herein.

In either case, once the light module assembly 102 is securely coupled to the mounting plate 112 with the torsion spring brackets 1102 and/or the light fixture 100 is mounted within the recessed can, the light fixture 100 may be rotated about an axis that is normal to the surface to which the light fixture is being mounted, such as a ceiling, such that the edges of the light fixture 100 may be aligned with the edges of a room in which the light fixture is installed.

In particular, as described above in association with the junction box mounting, the mounting plate 112 may be rotated about the curved slots, i.e., the installation slots 710a, b or 712a, b which in turn rotates the light module assembly 102 that is securely locked to the mounting plate 112. When the light fixture 100 is rotated about an axis that is normal to and passing through the center of the substantially square shaped light module assembly 102, the tongue feature 1216 passing through the installation slots 710a, b or 712a, b and the retention features 1220 received by the receiving slots 711a, b or installation slots 712a, b may move or slide along their respective slots from one end to an opposite end of the respective slots. In other words, to rotate the light fixture 100, the mounting plate 112 of the light fixture 100 moves about the tongue feature 1216 and the retention features 1220 along the length of the installation slots 710a, b or 712a, b and the receiving slot 711a, b, respectively. This rotation feature of the present disclosure allows a non-circular, e.g., square or rectangular shaped light fixtures to be installed into a round recessed can and then rotated clockwise or counterclockwise to align the edges of the square light fixture with the edge of the room regardless of the location of the torsion spring receivers located inside the fixed recessed can in the ceiling. Further, when the light fixture is rotated, the torsion spring bracket 1102 may remain fixed as it remains coupled to a fixed recessed can via the torsion springs 1104.

Even though the present disclosure describes a specific structure and shape of torsion spring brackets, one of ordinary skill in the art can understand and appreciate that in other example embodiments, the torsion spring brackets may be fewer or more features and the torsion spring brackets may have any other appropriate size or shape without departing from a broader scope of the present disclosure. Further, even though FIGS. 1, 6, 9, and 10 illustrate the light fixture 100 as being mounted directly to a junction box 114 and FIGS. 11-14 illustrate a light fixture 100 that is configured for mounting in a recessed can, in other example embodiments, the light fixture 100 may be surface mounted to a mounting surface using mousetrap like spring clips without departing from a broader scope of the present disclosure. An example embodiment of a light fixture 100 configured with the mousetrap like spring clips is described below in greater detail in association with FIGS. 15-19.

III. Surface Mounting

Figure 15:
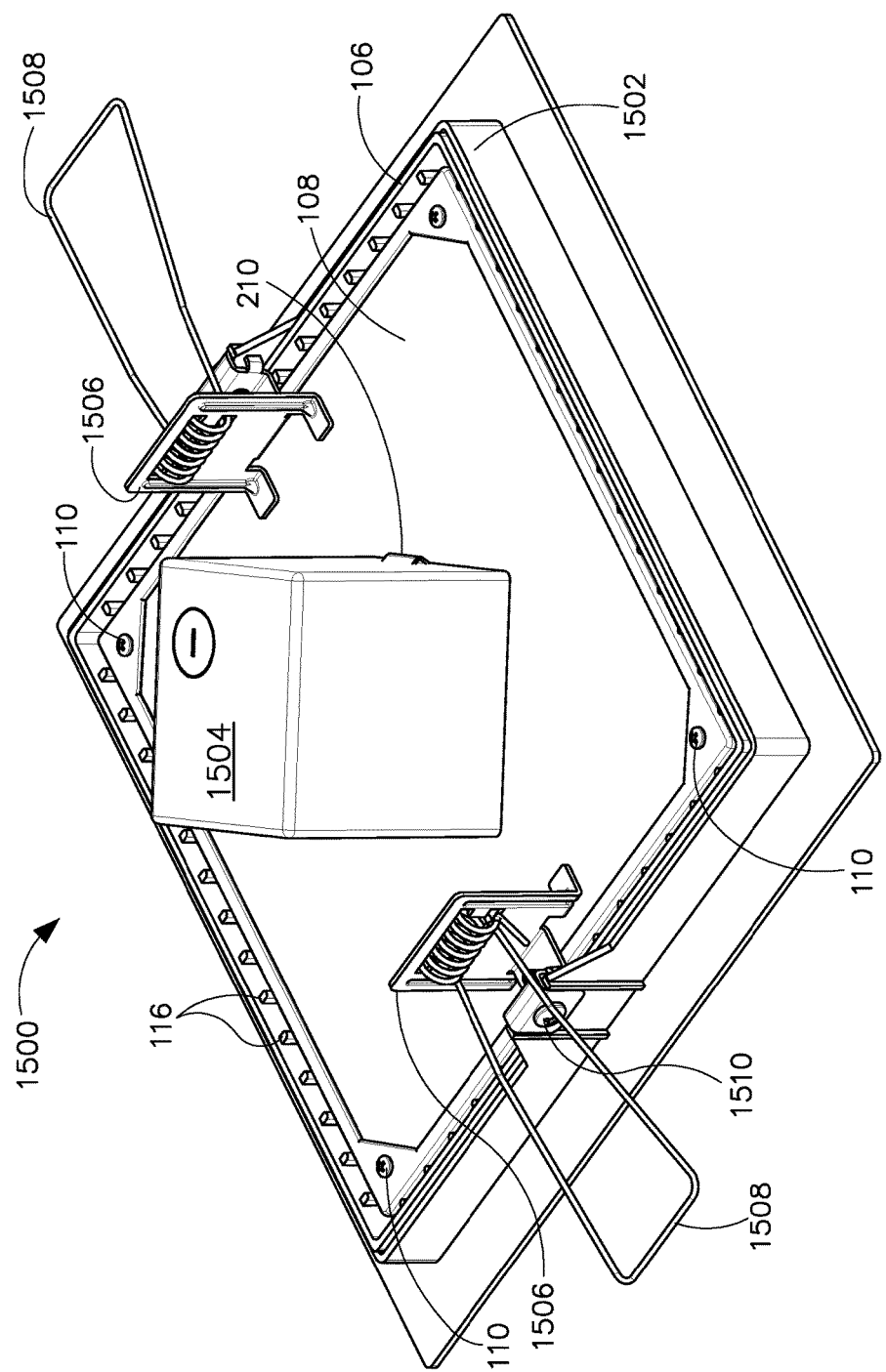
FIG. 15 illustrates a top perspective view of a light fixture that is configured to be surface mounted using a mousetrap like spring clip, in accordance with an example embodiment of the present disclosure.
Figure 16:
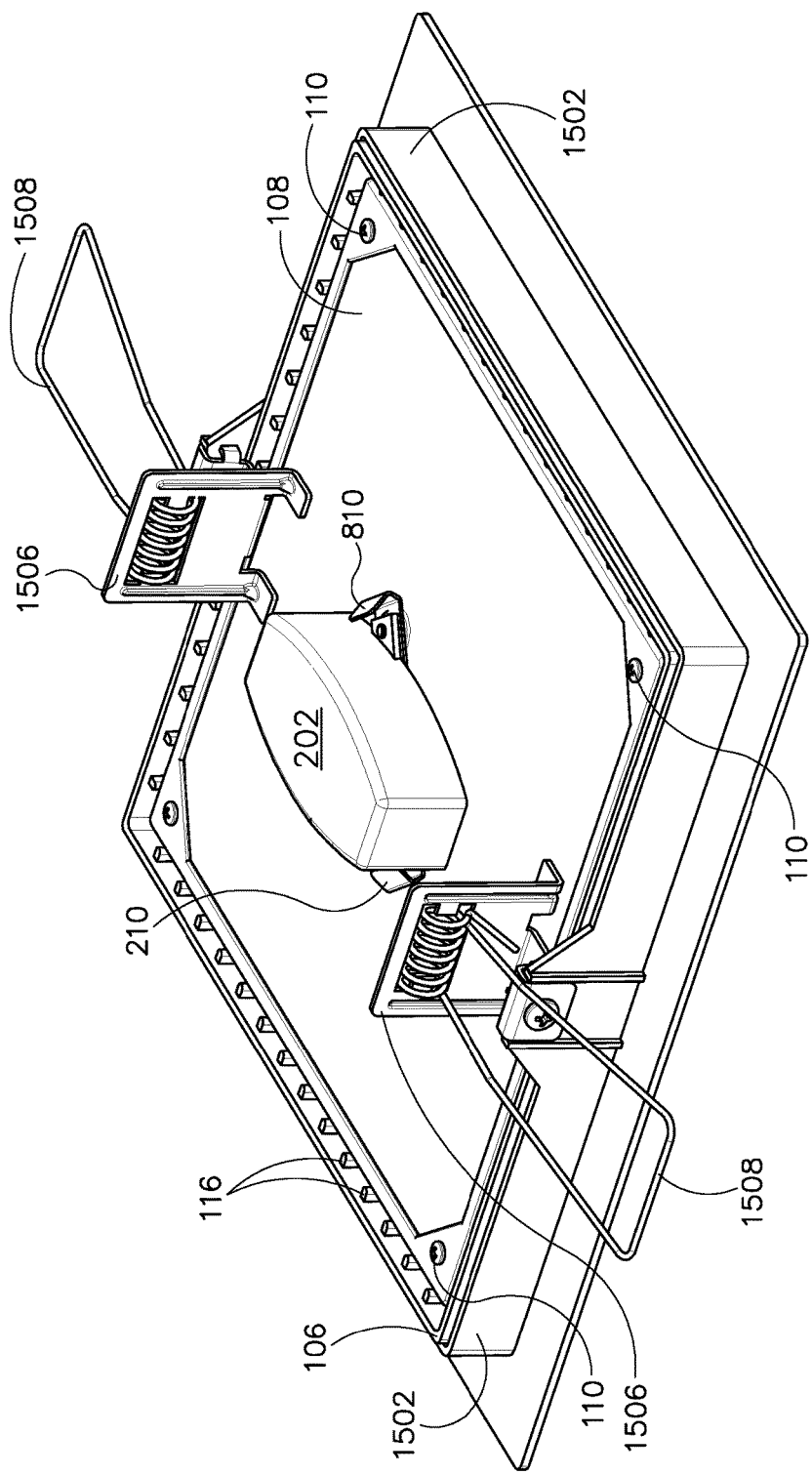
FIG. 16 illustrates a top perspective view of the light fixture of FIG. 15 without the junction box, in accordance with an example embodiment of the present disclosure.
Figure 17:
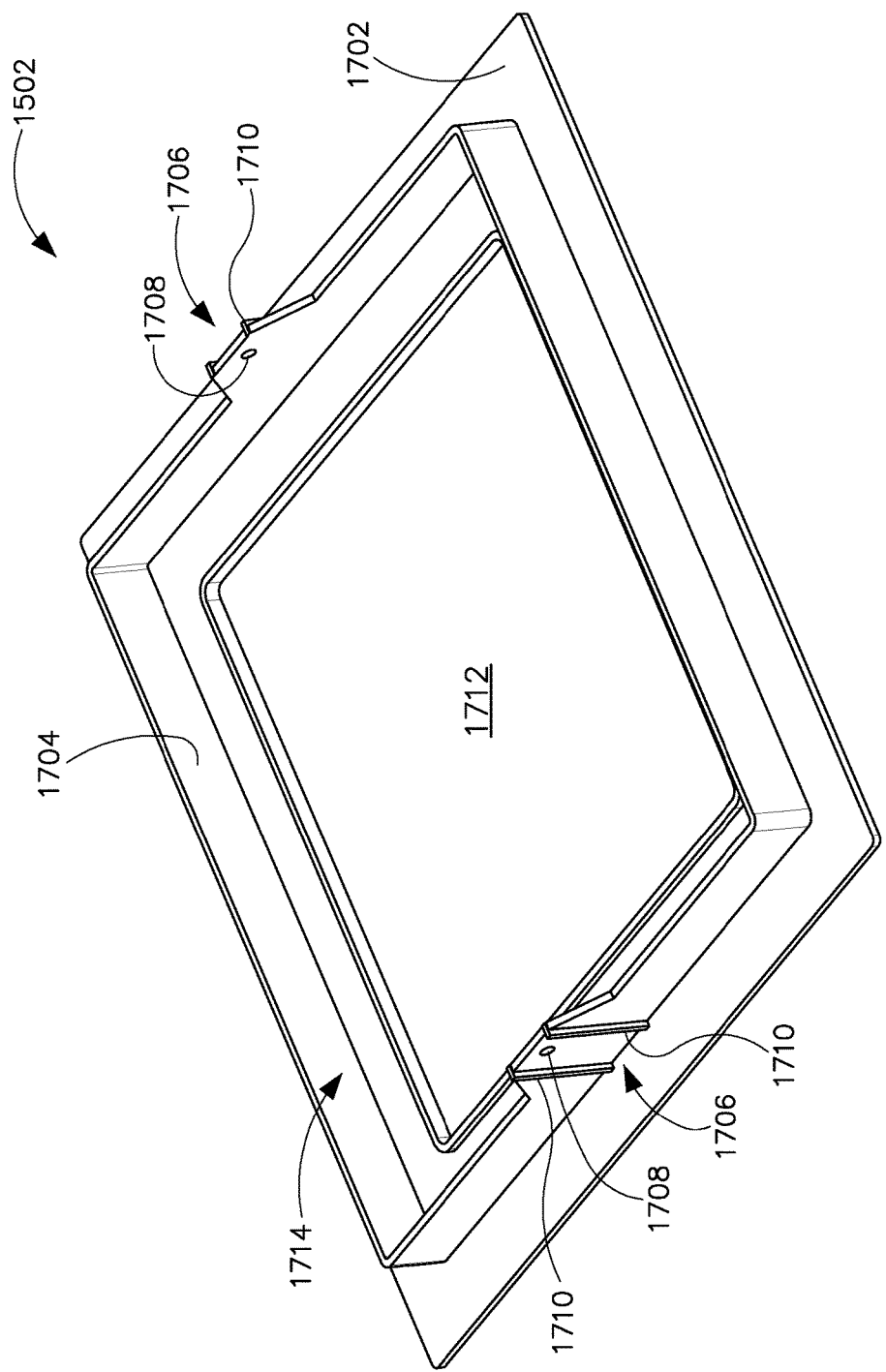
FIG. 17 illustrates a top perspective view of a surface mounting trim of the light fixture of FIG. 15, in accordance with an example embodiment of the present disclosure.

FIG. 15 illustrates a top perspective view of a light fixture that is configured to be surface mounted using a mousetrap like spring clip, in accordance with an example embodiment of the present disclosure; FIG. 16 illustrates a top perspective view of the light fixture of FIG. 15 without the junction box, in accordance with an example embodiment of the present disclosure; FIG. 17 illustrates a top perspective view of a surface mounting trim of the light fixture of FIG. 15, in accordance with an example embodiment of the present disclosure; and FIGS. 18 and 19 illustrate different perspective views of a spring clip bracket, in accordance with an example embodiment of the present disclosure.

Referring now to FIGS. 15-19, the light fixture 1500 may include a light module assembly 102 and a driver assembly 360 that is coupled to the light module assembly 102 as described above in association with FIGS. 1-10. Further, the light module assembly 102 and the driver assembly 360 of the light fixture 1500 illustrated in FIGS. 15-19 are substantially similar to that in FIGS. 1-10. Accordingly, the description of the light module assembly 102 and the driver assembly 360 will not be repeated herein for the sake of brevity. In other words, in order to simplify the description herein, only the portion/elements of the light fixture 1500 of FIGS. 15-19 that are different from the light fixture 100 illustrated in FIGS. 1-14 will be described in the following paragraphs.

In particular, the light fixture 1500 of FIGS. 15-19 may differ from the light fixture 100 of FIGS. 1-14 in that the light fixture 1500 of FIGS. 15-19 may not include a mounting plate 112. Instead, the light fixture 1500 of FIGS. 15-19 includes one or more spring clip brackets 1506 that are coupled to a surface mounting trim or frame 1502. In particular, as illustrated in FIG. 17, the surface mounting trim 1502 may have a substantially square shaped planar base portion 1702 that defines a substantially square shaped light emitting aperture 1712. Further, the surface mounting trim 1502 may include a side wall 1704 that is disposed between an inner perimeter of the planar base portion 1702, that defines the light emitting aperture 1712, and an outer perimeter of the planar base portion. The side wall 1704 may extend upwards from the planar base portion 1702 and is substantially perpendicular to the planar base portion 1702. The side wall 1704 along with a portion of the planar base portion 1702 may define a cavity 1714 that is configured to house the light module assembly 102 of the light fixture 1500 such that a lens 314 of the light module assembly 102 may be disposed over the light emitting aperture 1712. Furthermore, the side wall 1704 of the surface mounting trim 1502 may include one or more raised portions 1706. Each raised portion 1706 may have a coupling aperture 1708 and flanges 1710 disposed adjacent the coupling aperture 1708 on opposite sides of the coupling aperture 1709 as illustrated in FIG. 17. The coupling apertures 1708 of the raised portion 1706 may be configured to couple the spring clip brackets 1506 to the surface mounting trim 1502.

Figure 18:
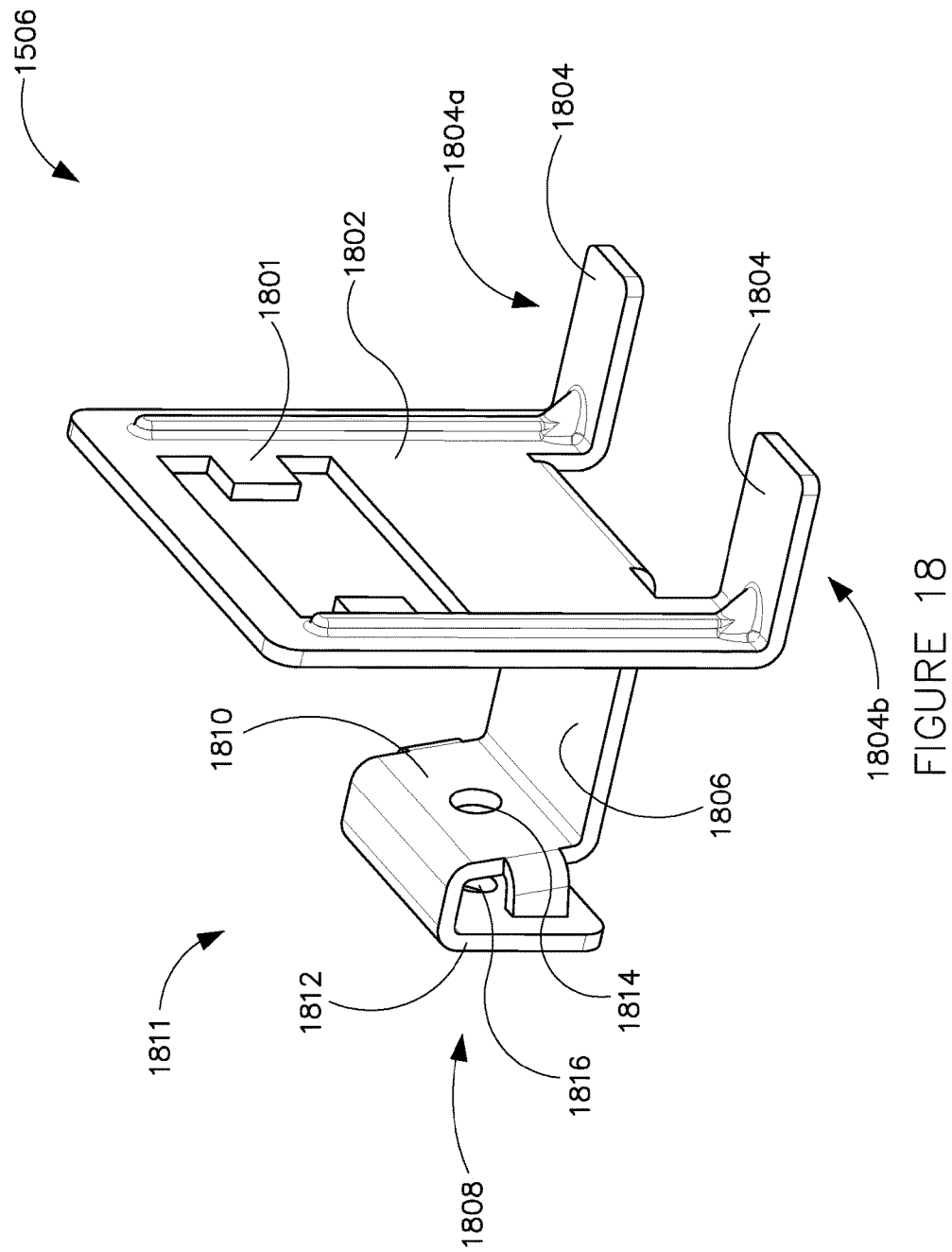
FIGS. 18 and 19 illustrate different perspective views of a spring clip bracket, in accordance with an example embodiment of the present disclosure.
Figure 19:
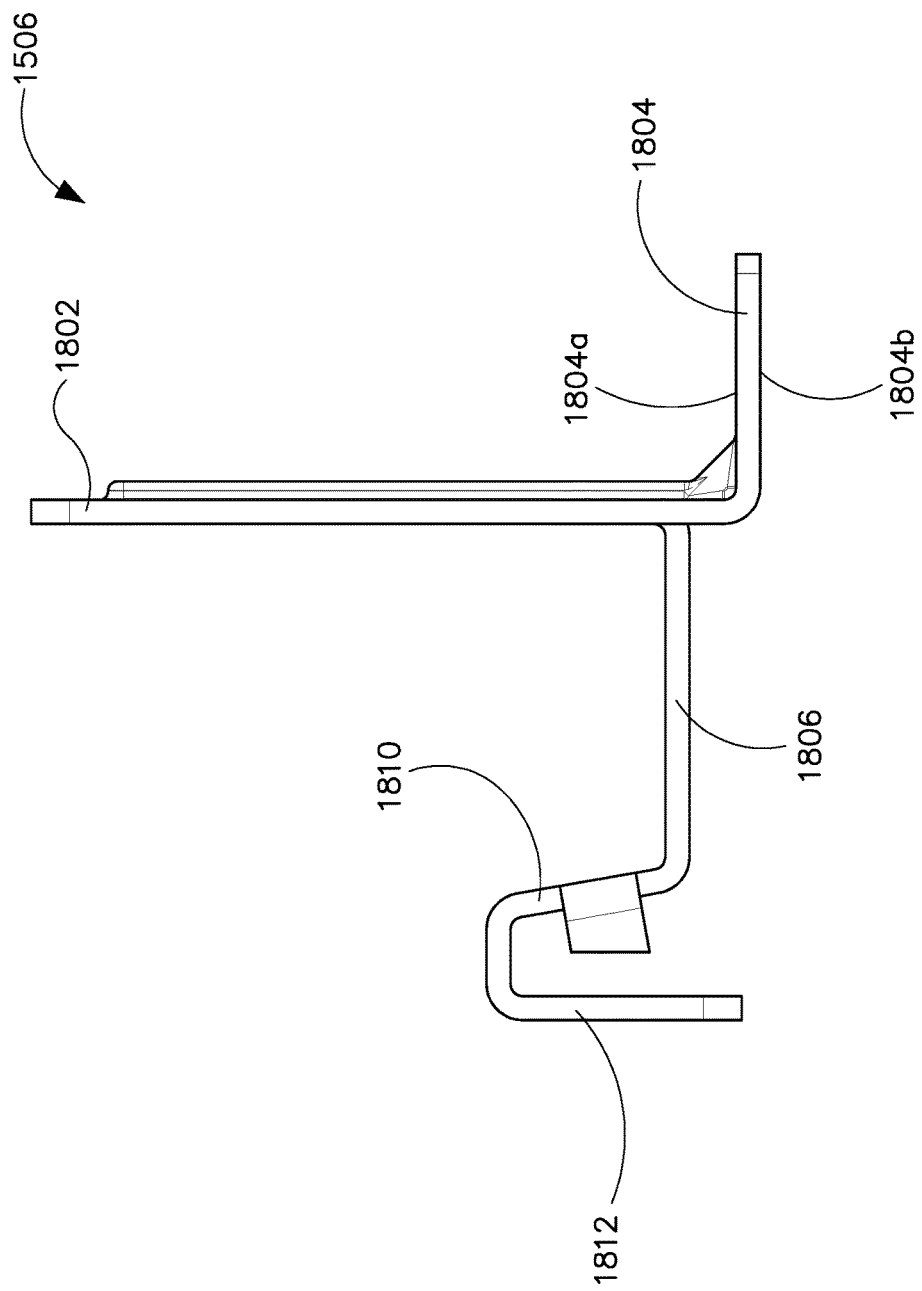

As illustrated in FIGS. 18 and 19, each spring clip bracket 1506 may include a first planar portion 1802 and a pair of feet 1804 that are substantially perpendicular to the first planar portion 1802. The pair of feet 1804 may extend from opposite sides of a lateral edge of the first planar portion 1802. In particular, the first planar portion 1802 may include clip receiver tabs 1801 that are configured to receive, securely retain, and couple the mousetrap like spring clip 1508 to the spring clip bracket 1506. Further, each spring clip bracket 1506 may include a tail portion 1811 that is configured to couple the spring clip bracket 1506 to the surface mounting trim 1502.

The tail portion 1811 may include a second planar portion 1806 that extends substantially perpendicular to the first planar portion 1802 from the lateral edge of the first planar portion 1802 and is positioned above the pair of feet 1804 in a direction opposite to that of the pair of feet 1804. The second planar portion 1806 may be substantially parallel to the pair of feet 1804. Further, the tail portion 1811 may include an end portion 1812 that is substantially parallel to the first planar portion 1802, and a middle portion 1810 that is disposed between the second planar portion 1806 and a top end of the end portion 1812. Each of the end portion 1812 and the middle portion 1810 may include apertures 1816 and 1814, respectively, that may be axially aligned to each other. Furthermore, the end portion 1812 and the middle portion 1810 may define a clamp shape that engages and hooks onto the raised portion 1706 of the surface mounting trim 1502 such that: (1) the raised portion 1706 of the surface mounting trim 1502 is disposed between the end portion 1812 and the middle portion 1810 of the spring clip bracket 1506, (2) the apertures 1812 and 1810 of the end portion 1812 and the middle portion 1810 is axially aligned with the coupling aperture 1708 of the surface mounting trim's raised portion 1706, and (3) edges of the end portion 1812 fit within the flanges 1710 of the raised portion 1706 of the surface mounting trim 1506. Further, the tail portion 1811 may be configured such that when the clamp shaped portion of the spring clip bracket 1506 engages and hooks onto the raised portion 1706 of the surface mounting trim 1502, the bottom surfaces 1804b of the feet 1804 rest on the top surface 502 of the top housing member 108. In particular, to couple the spring clip brackets 1506 to the surface mounting trim 1502, fasteners, such as screws 1510 may be passed through the axially aligned apertures 1816, 1814, and 1708 of the spring clip bracket 1506 and the surface mounting trim 1502, respectively.

Furthermore, the light fixture 1500 of FIGS. 15-19 may differ from the light fixture 100 of FIGS. 1-14 in that in the light fixture 1500 of FIGS. 15-19, the junction box 1504 may be directly coupled to the top surface 502 of the top housing member 108 via the spring tab member 210. For example, as illustrated in FIG. 15, the junction box 1504 may be securely retained between the two arms 804a and 804b of the spring tab member 210.

To surface mount the light fixture 1500, the spring clip bracket 1506 along with the mousetrap like spring clip 1508 may be coupled to the surface mounting trim 1502 that houses the light module assembly 102 as described above. Further, pressure may be applied to the mousetrap like spring clips 1508 to push them towards each other and the light fixture 1500 may be inserted into an opening in the mounting surface, e.g., a ceiling. Once the light fixture 1500 is inserted into the opening in the surface, the mousetrap like spring clip 1508 may revert back to its default position as illustrated in FIG. 15 and engage at least a portion of the mounting surface, e.g., a portion above the ceiling to securely retain the light fixture 1500 in place. When the mousetrap like spring clips 1508 revert back to their default position and engage the portion of the mounting surface, the light fixture 1500 may be pulled upward until a perimeter of the surface mounting trim 1502 grips or is pulled against the ceiling, thereby securely mounting the light fixture 1500.

Even though FIGS. 1, 6, 9, and 10 illustrate the light fixture 100 as being mounted directly to a junction box 114, FIGS. 11-14 illustrate a light fixture 100 that is configured for mounting in a recessed can using a torsion spring assembly, and FIGS. 15-19 illustrate surface mounting the light fixture using mousetrap like spring clips, in other example embodiments, the light fixture 100 may be recess mounted to a recessed can or a cavity in the ceiling using friction blades without departing from a broader scope of the present disclosure. An example embodiment of a light fixture 100 configured with friction blades is described below in greater detail in association with FIGS. 20 and 21.

IV. Recessed Mounting Using Friction Blades

Figure 20:
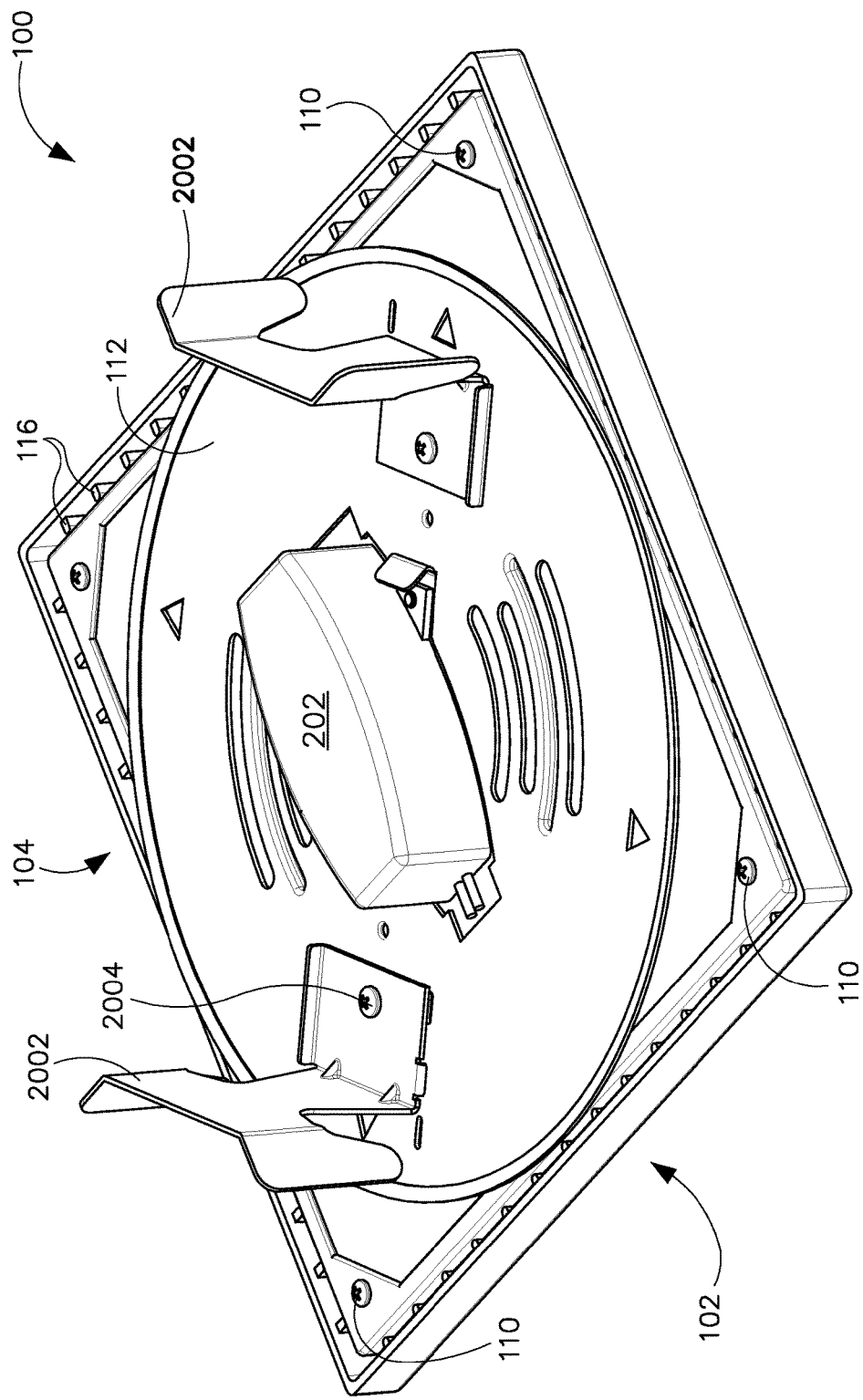
FIG. 20 illustrates a top perspective view of a light fixture that is configured to be recessed mounted using friction blades, in accordance with an example embodiment of the present disclosure.
Figure 21:
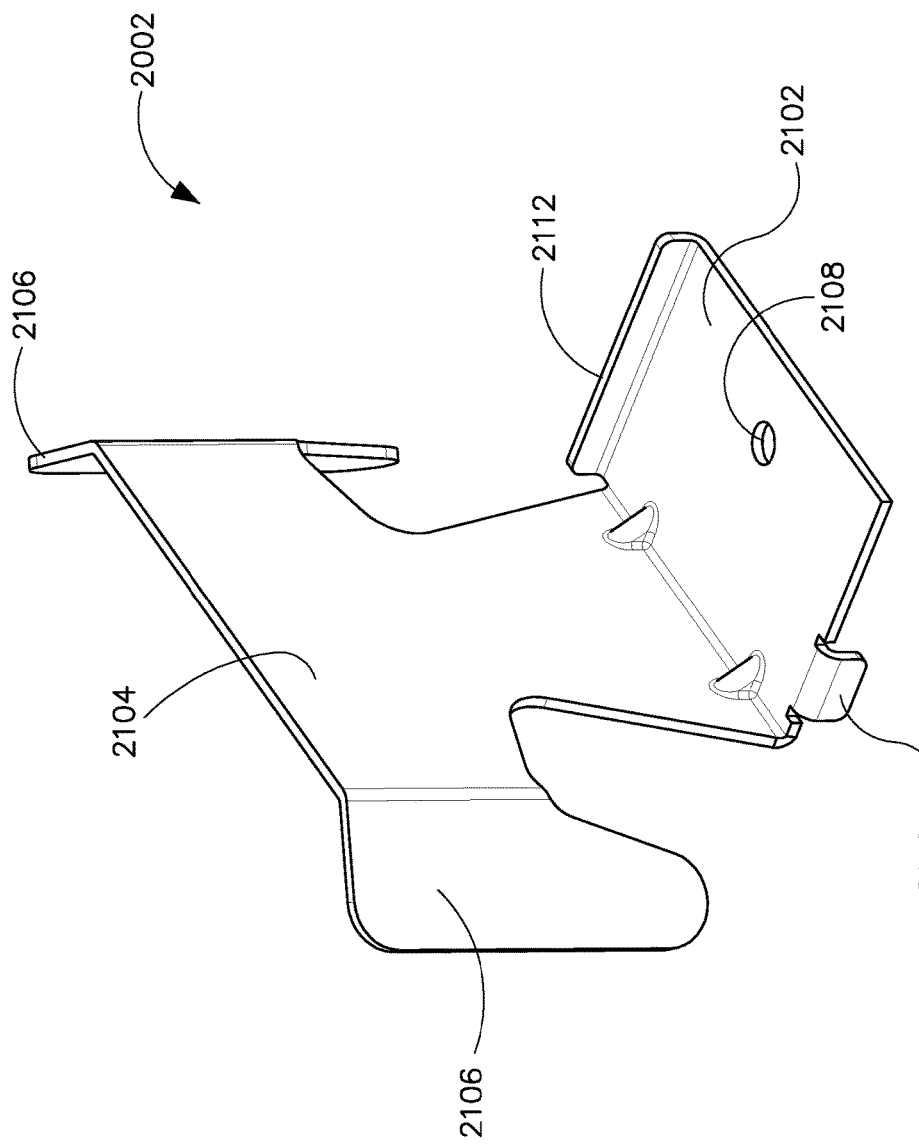
FIG. 21 illustrates a perspective view of a friction blade, in accordance with an example embodiment of the present disclosure.

FIG. 20 illustrates a top perspective view of a light fixture that is configured to be recessed mounted using friction blades, in accordance with an example embodiment of the present disclosure; and FIG. 21 illustrates a perspective view of a friction blade, in accordance with an example embodiment of the present disclosure.

Referring now to FIGS. 20-21, the light fixture 100 may include a light module assembly 102 and a driver assembly 360 that is coupled to the light module assembly 102 as described above in association with FIGS. 1-14. Further, the light module assembly 102 and the driver assembly 360 of the light fixture 100 illustrated in FIGS. 20-21 are substantially similar to that in FIGS. 1-14. Furthermore, the mounting plate 112 of the light fixture 100 in FIGS. 1-14 are substantially similar to that in FIGS. 1-14. Accordingly, the description of the light module assembly 102, the driver assembly 360, and the mounting plate 112 will not be repeated herein for the sake of brevity. In other words, in order to simplify the description herein, only the portion/elements of the light fixture 100 of FIGS. 20-21 that are different from the light fixture 100 illustrated in FIGS. 1-14 will be described in the following paragraphs.

Accordingly, referring now to FIGS. 20-21, the light fixture 100 may include friction blades 2002 that are attached to the mounting plate 112 using one or more fasteners, e.g., screw 2004. In particular, the friction blade 2002 may include a first planar portion 2102 and a second planar portion 2104 that is substantially perpendicular or at an angle to the first planar portion 2102. Further, the first planar portion 2102 may include an aperture 2108, a downward facing tab 2110 disposed at one side edge, and an upward facing flange 2112 disposed at an opposite side edge. Furthermore, the second planar portion 2104 may include two wing or blade portions 2106 disposed on opposite side edges of the second planar portion 2104. The two wing or blade portion 2106 are arranged such that they face a direction that is substantially opposite to the first planar portion 2102.

To attach each friction blade 2002 to the mounting plate 112, the first planar portion 2102 may be placed on top of the mounting plate 112 such that: (a) the downward facing tab 2110 of the first planar portion 2102 engages with a slot 708 of the mounting plate 112 and (b) the aperture 2108 of the first planar portion 2102 axially aligns with an aperture 706 of the mounting plate 112. Further, a fastener 2004 may be inserted through the aligned apertures (706 and 2108) of the friction blade 2002 and the mounting plate 112 to securely couple the friction blade 2002 to the mounting plate 112. However, in other example embodiments, the friction blade 2002 may be coupled to the mounting plate 112 via the curved slots 206a, b without departing from a broader scope of the present disclosure.

In one or more example embodiments, the friction blades 2002 may be used when an installer wants to mount the light fixture 100 to an existing recessed cans that do not have torsion spring receivers. As described above, the mounting plate 112 may have multiple holes 706, 708 which allow each friction blade to be installed by screwing them down to the mounting plate 112 and then pushing the mounting plate/friction blade assembly up into the recessed can. The blades or wings 2106 "flex" and the edges of the wings 2106 bite into the edge or inner surface of the recessed can and are held in place by friction.

Although the disclosures provides example embodiments, it should be appreciated by those skilled in the art that various modifications are well within the scope of the disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A light fixture comprising:
   a light module assembly;

a mounting plate that is coupled to the light module
assembly and comprising:
a central aperture;
a first set of elongated slots disposed on one side of the
central aperture; and
a second set of elongated slots disposed on an opposite
side of the central aperture,
wherein each set of elongated slots include an inner
pair of elongated slots and an outer pair of elongated slots, and wherein the inner pair of elongated slots are arranged closer to the central
aperture than the outer pair of elongated slots; and
a torsion spring assembly comprising:
one or more torsion spring brackets, each torsion spring
bracket configured to toolessly couple with the
mounting plate via at least one of the two sets of
elongated slots,
wherein the torsion spring assembly is configured to
mount the light module assembly in a recessed can
having a first diameter when the one or more
torsion spring brackets are coupled to the mounting plate via the inner pair of elongated slots of the
at least one of the two sets of elongated slots, and
wherein the torsion spring assembly is configured to
mount the light module assembly in a recessed can
having a second diameter when the one or more
torsion spring brackets are coupled to the mounting plate via the outer pair of elongated slots of the
at least one of the two sets of elongated slots.

2. The light fixture of claim 1, wherein the light module
assembly comprises:
a housing assembly that defines a cavity;
a plurality of LEDs coupled to one or more side walls of
the housing assembly; and
a light guide disposed in the cavity and comprising an
edge that is disposed adjacent the plurality of LEDs
such that light from the plurality of LEDs enters the
light guide through the edge and exits the light guide
through a major surface of the light guide towards an
area to be illuminated.

3. The light fixture of claim 1, wherein the torsion spring
assembly further comprises a torsion spring that is coupled
to each of the one or more torsion spring brackets.

4. The light fixture of claim 1, wherein each elongated slot
of the two sets of elongated slots has a substantially curved
or semi-circular profile.

5. The light fixture of claim 1, wherein the inner pair of
elongated slots include a first installation slot and a second
installation slot, wherein the outer pair of elongated slots
include a third installation slot and a receiving slot, wherein
the receiving slot is a blind slot, and wherein the first
installation slot, the second installation slot, and the third
installation slot are through slots.

6. The light fixture of claim 1, wherein each torsion spring
bracket comprises:
a first planar portion comprising one or more torsion
spring coupling features that are configured to securely
retain a torsion spring;
a second planar portion that is substantially perpendicular
to the first portion and extends from a lateral end of the
first planar portion, wherein the second planar portion
comprises:
a tongue feature extending out and downwards from the
second planar portion in a plane that is below and
substantially parallel to the second planar portion,
and
one or more retention features disposed on a bottom
surface of the second planar portion and adjacent a
lateral end of the second planar portion that is away
from the first planar portion; and
a support tab extending out from the lateral end of the first
planar portion in the direction opposite to the second
planar portion, wherein the support tab is substantially
perpendicular to the first planar portion and is substantially parallel to the second planar portion.

7. The light fixture of claim 6, wherein to toolessly
couple each torsion spring bracket with the mounting plate:
(a) the tongue feature of the torsion spring bracket is inserted
through an elongated slot of the inner pair of elongated slots
or the outer pair of elongated slots, and (b) the retention
features are received in another elongated slot of the inner
pair of elongated slots or the outer pair of elongated slots,
respectively.

8. The light fixture of claim 7, wherein once the light
module assembly is coupled to a recessed can via the torsion
spring assembly, the light module assembly is rotatable in a
clockwise or counterclockwise direction about an axis that is
normal to and passing through an approximate center of the
light module assembly.

9. The light fixture of claim 8, wherein to rotate the light
module assembly, the mounting plate is rotated along the
elongated slot and about the tongue feature of a respective
torsion spring bracket inserted through the elongated slot.

10. A light fixture comprising:
a light module assembly;
a mounting plate that is coupled to the light module
assembly and comprising:
a central aperture;
a first set of elongated slots disposed on one side of the
central aperture; and
a second set of elongated slots disposed on an opposite
side of the central aperture,
wherein each set of elongated slots include an inner
pair of elongated slots and an outer pair of elongated slots, and wherein the inner pair of elongated slots are arranged closer to the central
aperture than the outer pair of elongated slots, and
wherein the inner pair of elongated slots is configured to mount the light module assembly to a
junction box having a first diameter via one or
more fasteners that pass through at least one
elongated slot of the inner pair of elongated slots,
wherein the outer pair of elongated slots is configured to mount the light module assembly to a
junction box having a second diameter via one or
more fasteners that pass through at least one
elongated slot of the outer pair of elongated slots,
and
wherein the second diameter is larger than the first
diameter.

11. The light fixture of claim 10, wherein the light module
assembly comprises:
a housing assembly that defines a cavity;
a plurality of LEDs coupled to one or more side walls of
the housing assembly;
a light guide disposed in the cavity and comprising an
edge that is disposed adjacent the plurality of LEDs
such that light from the plurality of LEDs enters the
light guide through the edge and exits the light guide
through a major surface of the light guide towards an
area to be illuminated;
a top reflector panel disposed above the light guide; and
a lens disposed below the light guide.

12. The light fixture of claim 11, wherein the housing assembly comprises:
a top housing assembly that comprises a top surface and the one or more side walls extending substantially perpendicular to the top surface from a perimeter of the top surface,
wherein the top surface comprises one or more driver coupling apertures; and
a bottom housing assembly that is configured to couple to the top housing assembly such that they form the cavity.

13. The light fixture of claim 10, wherein each elongated slot of the two sets of elongated slots has a substantially curved or semi-circular profile.

14. The light fixture of claim 10, wherein the inner pair of elongated slots include a first installation slot and a second installation slot, wherein the outer pair of elongated slots include a third installation slot and a receiving slot, wherein the receiving slot is a blind slot, and wherein the first installation slot, the second installation slot, and the third installation slot are through slots.

15. The light fixture of claim 10, further comprising:
a driver assembly that is coupled to the housing assembly using one or more fasteners, wherein the driver assembly comprises:
a spring tab member having a planar base portion and a pair of arms, each arm extending from opposite ends of the planar base portion, wherein the spring tab member is coupled to a top surface of the housing assembly; and
a light emitting diode (LED) driver disposed on top of and coupled to the spring tab member.

16. The light fixture of claim 15, wherein the mounting plate is coupled to the housing assembly by snapping the mounting plate onto a top surface of the housing assembly using the spring tab member such that the driver and at least a portion of the pair of spring tab member arms pass through the central aperture of the mounting plate.

17. A light fixture comprising:
a surface mounting trim that comprises a base that has an inner perimeter that defines an aperture, an outer perimeter, and a side wall that is disposed between the inner perimeter and the outer perimeter, wherein the side wall extends substantially perpendicular to the base, and wherein the side wall and at least a portion of the base of the surface mounting trim define a through cavity that extends from another aperture defined by a top edge of the side wall through the aperture defined by the inner perimeter of the base;
a light module assembly disposed in the through cavity; and
one or more spring clip brackets, wherein the one or more spring clip brackets are coupled to the side wall of the surface mounting trim such that at least a portion of the one or more spring clip brackets are disposed on the light module assembly while being coupled to the side wall of the surface mounting trim,
wherein each spring clip bracket is coupled to a mousetrap like spring clip that is configured to engage with a mounting surface to securely retain the light fixture when the light fixture is surface mounted to the mounting surface.

18. The light fixture of claim 17, wherein the light module assembly comprises:
a top housing member that comprises a top surface and one or more housing side walls extending substantially perpendicularly from a perimeter of the top surface;
a plurality of LEDs coupled to the one or more side walls of the top housing member; and
a light guide comprising an edge that is disposed adjacent the plurality of LEDs such that light from the plurality of LEDs enters the light guide through the edge and exits the light guide through a major surface of the light guide towards an area to be illuminated.

19. The light fixture of claim 17, wherein each spring clip bracket comprises:
a first planar portion comprising one or more clip receiver tabs to securely retain and couple the mousetrap like spring clip to the spring clip bracket;
a pair of feet that are substantially perpendicular to the first planar portion, wherein the pair of feet extend from opposite sides of a lateral edge of the first planar portion; and
a tail portion that is configured to couple the spring clip bracket to the surface mounting trim, wherein the tail portion comprises a clamp shaped end having axially aligned apertures.

20. The light fixture of claim 19:
wherein the side wall of the surface mounting trim includes one or more raised portions, each raised portion having a coupling aperture, and
wherein each spring clip bracket is coupled to the surface mounting trim by coupling the clamp shaped end of the respective spring clip bracket to the respective raised portion of the surface mounting trim using a fastener that is passed through the axially aligned apertures of the clamp shaped end of the spring clip bracket and the coupling aperture of the surface mounting trim.

* * * * *